(12) United States Patent
Hawkins et al.

(10) Patent No.: US 8,739,492 B2
(45) Date of Patent: Jun. 3, 2014

(54) SPACE FRAME CONNECTOR

(75) Inventors: Robert Hawkins, Littleton, CO (US);
Adrian L. Farr, Conifer, CO (US);
Randall C. Gee, Arvada, CO (US)

(73) Assignee: Skyfuel, Inc., Arvada, CO (US)

( * ) Notice: Subject to any disclaimer, the term of this patent is extended or adjusted under 35 U.S.C. 154(b) by 0 days.

(21) Appl. No.: 12/500,467

(22) Filed: Jul. 9, 2009

(65) Prior Publication Data

US 2010/0005752 A1   Jan. 14, 2010

Related U.S. Application Data

(60) Provisional application No. 61/091,095, filed on Aug. 22, 2008, provisional application No. 61/079,382, filed on Jul. 9, 2008.

(51) Int. Cl.
*E04C 3/04* (2006.01)
*E04B 1/19* (2006.01)
*F24J 2/52* (2006.01)

(52) U.S. Cl.
USPC ......... 52/653.1; 52/653.2; 52/655.1; 403/169

(58) Field of Classification Search
CPC ....... E04B 1/1909; E04B 1/1903; E04B 1/19; E04B 2001/1975; E04B 2001/1936; E04B 2001/1933; E04B 2001/1903; E04B 2001/1984; E04B 2001/1921; E04B 2001/1957; E04B 2001/193; E04B 2001/1924; E04B 2001/1927; F16B 7/00; F24J 2/52; F24J 2/523; E04H 12/08; E04H 12/10; E04C 3/04; E04C 2003/0495; E04C 2003/0486
USPC ........... 52/653.1, 653.2, 655.1; 403/169, 170, 403/171, 176
See application file for complete search history.

(56) References Cited

U.S. PATENT DOCUMENTS

| | | | |
|---|---|---|---|
| 670,916 | A | 3/1901 | Eneas |
| 670,917 | A | 3/1901 | Eneas |

(Continued)

FOREIGN PATENT DOCUMENTS

| | | | |
|---|---|---|---|
| AT | 0321919 | E | 4/2006 |
| AT | 0448369 | E | 11/2009 |

(Continued)

OTHER PUBLICATIONS

"Truss Connection," YouTube, Jul. 4, 2007 http://www.youtube.com/watch?v=FtoQJONKRm0.

(Continued)

*Primary Examiner* — Andrew J Triggs
(74) *Attorney, Agent, or Firm* — Lathrop & Gage LLP

(57) ABSTRACT

A space frame connector is provided for attaching an oblique strut tube to an axial chord of a space frame. The space frame connector includes a collar adapted to fit over an axial chord. The collar is equipped with one or more attachment flanges. The space frame connector also includes a strut tube having an extrusion flange formed in at least one of its ends. The extrusion flange is made up of two parallel leaves that define a slot between them. The slot is sized and shaped to fit over an attachment flange on the collar that is positioned over the axial chord. The extrusion flange can be formed using simple press and punch tools. Space frames used to support solar energy collector arrays can be assembled in the field, including formation of the extrusion flanges on the oblique strut tubes, or multiple strut tubes can be attached to axial chords and compactly packed and transported to the field for use in constructing space frames, for example for supporting large parabolic trough solar collectors.

14 Claims, 14 Drawing Sheets

(56) References Cited

U.S. PATENT DOCUMENTS

| | | | | |
|---|---|---|---|---|
| 1,092,503 | A | 4/1914 | Moore | |
| 1,760,883 | A | 6/1930 | Moss | |
| 1,792,489 | A | 2/1931 | Gilmore | |
| 2,955,955 | A | 10/1960 | Orr | |
| 3,070,923 | A | 1/1963 | Fellman | |
| 3,187,592 | A | 6/1965 | Geyer | |
| 3,459,234 | A | 8/1969 | Richter et al. | |
| 3,463,527 | A * | 8/1969 | Baker | 411/78 |
| 3,511,134 | A | 5/1970 | Wittren | |
| 3,548,866 | A | 12/1970 | Kaiser et al. | |
| 3,559,534 | A | 2/1971 | Munro | |
| 3,564,783 | A | 2/1971 | Dunne | |
| 3,668,754 | A | 6/1972 | Boast | |
| 3,710,674 | A * | 1/1973 | Tabor | 411/61 |
| 3,775,226 | A | 11/1973 | Windorf | |
| 3,861,379 | A | 1/1975 | Anderson | |
| 3,872,854 | A | 3/1975 | Raser | |
| 3,946,532 | A | 3/1976 | Gilb | |
| 4,031,444 | A | 6/1977 | Beck, Jr. | |
| 4,031,879 | A | 6/1977 | Parham | |
| 4,069,635 | A | 1/1978 | Gilb | |
| 4,069,812 | A | 1/1978 | O'Neill | |
| 4,077,176 | A | 3/1978 | Bauer | |
| 4,078,549 | A | 3/1978 | McKeen et al. | |
| 4,119,365 | A | 10/1978 | Powell | |
| 4,126,993 | A | 11/1978 | Grattapaglia et al. | |
| 4,127,926 | A | 12/1978 | White | |
| 4,141,626 | A | 2/1979 | Treytl et al. | |
| 4,146,785 | A | 3/1979 | Neale | |
| 4,158,356 | A | 6/1979 | Wininger | |
| 4,159,710 | A | 7/1979 | Prast | |
| 4,161,905 | A | 7/1979 | Ota | |
| 4,178,913 | A | 12/1979 | Hutchinson | |
| 4,191,164 | A | 3/1980 | Kelly | |
| 4,195,620 | A | 4/1980 | Rust | |
| 4,211,922 | A | 7/1980 | Vaerewyck et al. | |
| 4,226,910 | A | 10/1980 | Dahlen et al. | |
| 4,230,763 | A | 10/1980 | Skolnick | |
| 4,237,864 | A | 12/1980 | Kravitz | |
| 4,269,173 | A | 5/1981 | Krueger et al. | |
| 4,293,192 | A | 10/1981 | Bronstein | |
| 4,307,150 | A | 12/1981 | Roche | |
| 4,313,367 | A | 2/1982 | Weyer | |
| 4,313,422 | A | 2/1982 | McEntee | |
| 4,318,394 | A | 3/1982 | Alexander | |
| 4,328,789 | A | 5/1982 | Nelson | |
| 4,337,560 | A * | 7/1982 | Slysh | 29/897.31 |
| 4,343,533 | A | 8/1982 | Currin et al. | |
| 4,352,511 | A | 10/1982 | Ribble et al. | |
| 4,354,484 | A | 10/1982 | Malone et al. | |
| 4,363,354 | A | 12/1982 | Strickland | |
| 4,368,962 | A | 1/1983 | Hultberg | |
| 4,372,027 | A | 2/1983 | Hutchison | |
| 4,373,514 | A | 2/1983 | Lois | |
| 4,398,802 | A | 8/1983 | Auger et al. | |
| 4,414,254 | A | 11/1983 | Iwata et al. | |
| 4,423,719 | A | 1/1984 | Hutchinson | |
| 4,425,904 | A | 1/1984 | Butler | |
| 4,440,150 | A | 4/1984 | Kaehler | |
| 4,446,262 | A | 5/1984 | Okumura et al. | |
| 4,465,057 | A | 8/1984 | Nikkel et al. | |
| 4,487,196 | A | 12/1984 | Murphy | |
| 4,493,872 | A | 1/1985 | Funderburk et al. | |
| 4,500,970 | A | 2/1985 | Daemmer | |
| 4,510,923 | A | 4/1985 | Bronstein | |
| 4,523,575 | A | 6/1985 | Nikkel et al. | |
| 4,536,847 | A | 8/1985 | Erickson et al. | |
| 4,571,812 | A | 2/1986 | Gee | |
| 4,577,449 | A | 3/1986 | Celli | |
| 4,587,951 | A | 5/1986 | Townsend et al. | |
| 4,596,238 | A | 6/1986 | Bronstein | |
| 4,597,377 | A | 7/1986 | Melamed | |
| 4,604,990 | A | 8/1986 | Nikkel et al. | |
| 4,608,964 | A | 9/1986 | Russo | |
| 4,611,575 | A * | 9/1986 | Powell | 126/605 |
| 4,628,692 | A | 12/1986 | Pierce | |
| 4,645,714 | A | 2/1987 | Roche et al. | |
| 4,655,021 | A * | 4/1987 | Franchin et al. | 52/641 |
| 4,666,263 | A | 5/1987 | Petcavish | |
| 4,678,292 | A | 7/1987 | Miyatani et al. | |
| 4,684,280 | A * | 8/1987 | Dirkin et al. | 403/157 |
| 4,710,426 | A | 12/1987 | Stephens | |
| 4,719,903 | A | 1/1988 | Powell | |
| 4,739,620 | A | 4/1988 | Pierce | |
| 4,743,095 | A | 5/1988 | Dane | |
| 4,832,001 | A | 5/1989 | Baer | |
| 4,853,283 | A | 8/1989 | Skolnick | |
| 4,888,063 | A | 12/1989 | Powell | |
| 4,893,183 | A | 1/1990 | Nayar | |
| 4,913,468 | A | 4/1990 | Rattmann | |
| 4,933,823 | A | 6/1990 | Taylor | |
| 5,006,988 | A | 4/1991 | Borenstein et al. | |
| 5,013,176 | A | 5/1991 | Orbom | |
| 5,049,005 | A | 9/1991 | Lazare et al. | |
| 5,058,565 | A | 10/1991 | Gee et al. | |
| 5,063,112 | A | 11/1991 | Gross et al. | |
| 5,069,964 | A | 12/1991 | Tolliver et al. | |
| 5,071,243 | A | 12/1991 | Bronstein | |
| 5,076,724 | A | 12/1991 | Silber | |
| 5,118,540 | A | 6/1992 | Hutchison | |
| 5,136,593 | A | 8/1992 | Moon et al. | |
| 5,138,838 | A | 8/1992 | Crosser | |
| 5,205,101 | A | 4/1993 | Swan et al. | |
| 5,219,264 | A | 6/1993 | McClure et al. | |
| 5,228,259 | A * | 7/1993 | Haddad et al. | 52/653.2 |
| 5,237,337 | A | 8/1993 | Hutchison et al. | |
| 5,251,064 | A | 10/1993 | Tennant et al. | |
| 5,276,600 | A | 1/1994 | Takase et al. | |
| 5,285,627 | A | 2/1994 | Losel et al. | |
| 5,334,844 | A | 8/1994 | Pollard et al. | |
| 5,347,986 | A | 9/1994 | Cordy | |
| 5,350,201 | A | 9/1994 | Bynum | |
| 5,361,172 | A | 11/1994 | Schissel et al. | |
| 5,367,174 | A | 11/1994 | Bazile et al. | |
| 5,398,462 | A | 3/1995 | Berlin et al. | |
| 5,404,868 | A | 4/1995 | Sankrithi | |
| 5,444,972 | A | 8/1995 | Moore | |
| 5,446,356 | A | 8/1995 | Kim | |
| 5,448,868 | A | 9/1995 | Lalvani | |
| 5,484,634 | A * | 1/1996 | Schutze | 428/36.1 |
| 5,531,216 | A | 7/1996 | Nicklas et al. | |
| 5,542,409 | A | 8/1996 | Sampayo | |
| 5,673,684 | A | 10/1997 | Myles, III et al. | |
| 5,681,642 | A | 10/1997 | Sugisaki et al. | |
| 5,706,798 | A | 1/1998 | Steinorth | |
| 5,787,877 | A | 8/1998 | Nicklas et al. | |
| 5,793,934 | A | 8/1998 | Bauer | |
| 5,804,942 | A | 9/1998 | Jeong | |
| 5,806,553 | A | 9/1998 | Sidwell | |
| 5,819,008 | A | 10/1998 | Asama et al. | |
| 5,820,168 | A | 10/1998 | De Giacomoni | |
| 5,846,659 | A | 12/1998 | Lower et al. | |
| 5,851,309 | A | 12/1998 | Kousa | |
| 5,857,322 | A | 1/1999 | Cohn | |
| 5,896,488 | A | 4/1999 | Jeong | |
| 5,899,199 | A | 5/1999 | Mills | |
| 5,929,530 | A | 7/1999 | Stone | |
| 5,938,364 | A | 8/1999 | Hayden | |
| 5,956,917 | A | 9/1999 | Reynolds | |
| 5,964,216 | A | 10/1999 | Hoffschmidt et al. | |
| 5,982,481 | A | 11/1999 | Stone et al. | |
| 6,000,211 | A | 12/1999 | Bellac et al. | |
| 6,041,274 | A | 3/2000 | Onishi et al. | |
| 6,056,240 | A | 5/2000 | Hagenlocher | |
| 6,065,267 | A | 5/2000 | Fisher | |
| 6,111,638 | A | 8/2000 | Chou et al. | |
| 6,123,067 | A | 9/2000 | Warrick | |
| 6,131,565 | A | 10/2000 | Mills | |
| 6,169,414 | B1 | 1/2001 | Yoshino et al. | |
| 6,205,739 | B1 * | 3/2001 | Newlin | 52/655.1 |
| 6,234,166 | B1 | 5/2001 | Katsir et al. | |
| 6,237,337 | B1 | 5/2001 | Bronicki et al. | |
| 6,250,693 | B1 | 6/2001 | Gensert et al. | |
| 6,279,312 | B1 | 8/2001 | Hennecke | |

(56) References Cited

U.S. PATENT DOCUMENTS

| | | |
|---|---|---|
| 6,292,752 B1 | 9/2001 | Franke et al. |
| 6,317,229 B1 | 11/2001 | Otterson |
| 6,321,539 B1 | 11/2001 | Bronicki et al. |
| 6,349,521 B1 | 2/2002 | McKeon et al. |
| 6,359,212 B1 | 3/2002 | Hall et al. |
| 6,409,228 B1 | 6/2002 | Fadini et al. |
| 6,433,867 B1 | 8/2002 | Esquivel |
| 6,469,466 B1 | 10/2002 | Suzuki |
| 6,470,271 B2 | 10/2002 | Matsunaga |
| 6,484,506 B1 | 11/2002 | Bellac et al. |
| 6,625,983 B2 | 9/2003 | Kawasaki |
| 6,639,421 B1 | 10/2003 | Yoshino et al. |
| 6,662,801 B2 | 12/2003 | Hayden et al. |
| 6,675,546 B2 * | 1/2004 | Coles .................... 52/655.1 |
| 6,680,693 B2 | 1/2004 | Urban et al. |
| 6,688,303 B2 | 2/2004 | Davenport et al. |
| 6,694,738 B2 | 2/2004 | Bronicki et al. |
| 6,708,455 B1 * | 3/2004 | Niiduma .................... 52/81.2 |
| 6,740,381 B2 | 5/2004 | Day et al. |
| 6,772,062 B2 | 8/2004 | Lasky et al. |
| 6,772,671 B2 | 8/2004 | Asano et al. |
| 6,792,759 B2 | 9/2004 | Rollins, III |
| 6,827,911 B1 | 12/2004 | Gering |
| 6,837,010 B2 | 1/2005 | Powell et al. |
| 6,848,796 B2 | 2/2005 | Tagirov |
| 6,862,864 B2 * | 3/2005 | O'Banion et al. ........ 52/800.16 |
| 6,892,502 B1 | 5/2005 | Hubbell et al. |
| 6,989,924 B1 | 1/2006 | Jorgensen et al. |
| 7,055,519 B2 | 6/2006 | Litwin et al. |
| 7,065,927 B2 | 6/2006 | Powell et al. |
| 7,104,064 B2 | 9/2006 | Hon |
| 7,155,309 B2 | 12/2006 | Peless et al. |
| 7,163,241 B2 | 1/2007 | Liu et al. |
| 7,197,856 B2 * | 4/2007 | Coles ........................ 52/638 |
| 7,228,230 B2 | 6/2007 | Hirokawa |
| 7,281,381 B2 | 10/2007 | Johnson |
| 7,291,056 B2 | 11/2007 | Ohishi et al. |
| 7,349,759 B2 | 3/2008 | Peless et al. |
| 7,393,577 B2 | 7/2008 | Day et al. |
| 7,530,201 B2 | 5/2009 | Reynolds et al. |
| 7,578,109 B2 * | 8/2009 | Reynolds et al. ........... 52/648.1 |
| 7,587,862 B2 * | 9/2009 | Reynolds et al. ........... 52/81.3 |
| 7,612,937 B2 | 11/2009 | Jorgensen et al. |
| 7,883,288 B2 * | 2/2011 | Jorna ........................ 403/171 |
| 8,069,632 B2 * | 12/2011 | Li .................................. 52/646 |
| 2003/0163966 A1 | 9/2003 | Reynolds et al. |
| 2004/0033105 A1 | 2/2004 | North |
| 2004/0074180 A1 | 4/2004 | Barmakian et al. |
| 2004/0074202 A1 | 4/2004 | Barmakian et al. |
| 2004/0128940 A1 * | 7/2004 | LaForge .................... 52/655.1 |
| 2004/0168383 A1 | 9/2004 | Reynolds et al. |
| 2004/0244376 A1 | 12/2004 | Litwin et al. |
| 2005/0034437 A1 | 2/2005 | McMurty et al. |
| 2005/0050836 A1 | 3/2005 | Barmakian |
| 2005/0252153 A1 | 11/2005 | Barmakian et al. |
| 2006/0048800 A1 | 3/2006 | Rast et al. |
| 2006/0053726 A1 | 3/2006 | Reynolds et al. |
| 2006/0174622 A1 | 8/2006 | Skowronski |
| 2006/0181765 A1 | 8/2006 | Jorgensen et al. |
| 2006/0225729 A1 | 10/2006 | Litwin |
| 2006/0229773 A1 | 10/2006 | Peretz |
| 2006/0260314 A1 | 11/2006 | Kincaid et al. |
| 2006/0277843 A1 * | 12/2006 | Livingston et al. ............. 52/110 |
| 2007/0011983 A1 * | 1/2007 | Reynolds et al. ............... 52/633 |
| 2008/0046130 A1 | 2/2008 | Faivre et al. |
| 2008/0050579 A1 | 2/2008 | Kirkman et al. |
| 2008/0072516 A1 | 3/2008 | Reynolds et al. |
| 2008/0127595 A1 | 6/2008 | Reynolds et al. |
| 2008/0127647 A1 | 6/2008 | Leitner |
| 2008/0168981 A1 | 7/2008 | Cummings et al. |
| 2008/0204352 A1 | 8/2008 | Reynolds et al. |
| 2008/0226846 A1 | 9/2008 | Hill |
| 2008/0247069 A1 | 10/2008 | Bronstein |
| 2008/0283113 A1 | 11/2008 | Conger |
| 2008/0308094 A1 * | 12/2008 | Johnston ........................ 126/694 |
| 2009/0000613 A1 | 1/2009 | Edwards et al. |
| 2009/0095283 A1 | 4/2009 | Curtis et al. |
| 2009/0101195 A1 | 4/2009 | Reynolds et al. |
| 2009/0188488 A1 | 7/2009 | Kraft et al. |
| 2009/0205637 A1 | 8/2009 | Moore et al. |
| 2009/0260753 A1 | 10/2009 | Selig et al. |
| 2010/0000570 A1 | 1/2010 | Mertins et al. |
| 2010/0032016 A1 | 2/2010 | Gee et al. |
| 2010/0043776 A1 | 2/2010 | Gee |
| 2010/0071683 A1 | 3/2010 | Selig et al. |
| 2010/0199972 A1 | 8/2010 | Brost |

FOREIGN PATENT DOCUMENTS

| | | |
|---|---|---|
| AU | 4995099 A1 | 1/2001 |
| AU | 7300713 | 4/2008 |
| AU | 8311746 | 4/2009 |
| CA | 721243 | 11/1965 |
| CA | 2664192 | 4/2008 |
| CN | 1376228 | 10/2002 |
| CN | 1170993 | 10/2004 |
| CN | 101529027 A | 9/2009 |
| DE | 43 17 279 | 12/1994 |
| DE | 203 14 172 | 12/2003 |
| DE | 69930635 T2 | 12/2006 |
| DE | 602007003164 | 12/2009 |
| EP | 0314199 B1 | 9/1991 |
| EP | 1 522 742 | 4/2005 |
| EP | 1 801 517 | 12/2005 |
| EP | 1 764 565 | 2/2006 |
| EP | 1200683 B1 | 3/2006 |
| EP | 1 754 942 | 2/2007 |
| EP | 1903155 B1 | 11/2009 |
| EP | 2123834 A1 | 11/2009 |
| EP | 2128352 A1 | 12/2009 |
| EP | 2154301 A3 | 2/2010 |
| FR | 2 667 092 | 3/1992 |
| GB | 287 023 | 3/1928 |
| IL | 0197541 | 12/2009 |
| JP | 58150831 | 9/1983 |
| JP | 59012952 | 1/1984 |
| JP | 59072401 | 4/1984 |
| JP | 62011744 | 1/1987 |
| JP | 2262037 | 10/1990 |
| JP | 4333254 | 11/1992 |
| JP | 06003194 | 1/1994 |
| JP | 11182026 | 7/1999 |
| JP | 2001077384 | 3/2001 |
| JP | 2002063807 | 2/2002 |
| JP | 2003194419 | 7/2003 |
| JP | 2003229009 | 8/2003 |
| MX | 2009003087 | 5/2009 |
| WO | WO 80/02604 | 11/1980 |
| WO | WO 92/18715 | 10/1992 |
| WO | WO 96/33787 | 10/1996 |
| WO | WO 00/07818 | 2/2000 |
| WO | WO 01/04430 | 1/2001 |
| WO | WO 02/082037 | 10/2002 |
| WO | WO 2004/099682 | 11/2004 |
| WO | WO 2005/003645 | 1/2005 |
| WO | WO 2005/003646 | 1/2005 |
| WO | WO 2005/003647 | 1/2005 |
| WO | WO 2005/078360 | 8/2005 |
| WO | WO 2005/108959 | 11/2005 |
| WO | WO 2008/058528 | 3/2008 |
| WO | WO 2008/039233 | 4/2008 |
| WO | WO 2008/039233 | 12/2008 |
| WO | WO 2009/052220 | 4/2009 |
| WO | WO 2009/052520 | 4/2009 |
| WO | WO 2009/105291 | 8/2009 |
| WO | WO 2010/006056 | 1/2010 |
| WO | WO 2010/006193 | 1/2010 |
| WO | WO 2010/022280 | 2/2010 |
| WO | WO 2010/083292 | 7/2010 |

OTHER PUBLICATIONS

"National Renewable Energy Laboratory, USA Rough: Near-Term Component/Subsystem Development, Task I-B-1: Space Frame

(56) References Cited

OTHER PUBLICATIONS

Design, Draft Detailed Report" (Aug. 25, 2005), prepared by Gossamer Space Frames.
International Search Report and Written Opinion mailed Aug. 27, 2009 for corresponding International Application No. PCT/US09/50144.
U.S. Appl. No. 61/079,382, filed Jul. 9, 2008, Farr et al.
U.S. Appl. No. 61/029,466, filed Feb. 18, 2009, Gee et al.
Automation Direct (downloaded Aug. 23, 2010) "GS2 Series Specifications" Drives/Motors/Motion vol. 13, e13-22 http://www.automationdirect.com/adc/Shopping/Catalog/Drives/GS2_ (115_-z-_230_-z-_460_-z-_575_VAC_V-z-Hz_Control)/GS2_Drive_Units_(115_-z-_230_-z-_460_-z-_575_VAC)/GS2-11P0.
Baccaro, S., et al. (2003), "Quality control facilities for large optical reflectors at ENEA-Casaccia for physics application," Nuclear Physics B (Proc. Suppl.) 125:272-276.
Dersch et al. (2004) "Trough Integration into Power Plants—A Study on the Performance and Economy of Integrated Solar Combined Cycle Systems," Energy 29:947-959.
Eckart [Hydraulik • Pneumatik] (downloaded Aug. 23, 2010) "Produkte mit starkem Profil" http://www.eckart-gmbh.de/.
El-Sayed, M. (2005) "Solar Supported Steam Production for Power Generation in Egypt," Energy Policy 33:1251-1259.
El-Wakil, M.M. (1984) "Combined Cycles: General," In; Powerplant Technology, New York: McGraw-Hill Hardcover, pp. 341-351.
Feuermann, D., et al. (2002), "Solar Fiber-Optic Mini-Dish Concentrators: First Experimental Results and Field Experience," Solar Energy 72(6):459-472.
Flagsol (2006) "ISCCS—Integrated Solar Combined Cycle System," http://www.flagsol.com/ISCCS_tech.htm, Downloaded Sep. 9, 2006.
Horn et al. (2004) "Economic Analysis of Integrated Solar Combined Cycle Power Plants; A Sample Case: The Economic Feasibility of an ISCCS Power Plant in Egypt," Energy 29:935-945.
Hosseini et al. (2005) "Technical and Economic Assessment of the Integrated Solar Combined Cycle Power Plants in Iran," Renewable Energy 30:1541-1555.
HELAC Corporation (Apr. 2007) "Helical, Hydraulic Rotary Actuators, T20 Series," Product Manual.
HELAC Corporation, (2003) "Helical, Hydraulic Rotary Actuators, L20 Series," Product Manual.
HELAC Corporation (2004) "Helical, Hydraulic Rotary Actuators, L30 Series," Product Manual.
HELAC Corporation (Jun. 2001) "Sprayer Steers Clear of the Ordinary," *Hydraulics and Pneumatics* http://www.hydraulicspneumatics.com.
Kaminski, J. et al. (2006), "Full-Field Shape Measurement of Specular Surfaces," in Fringe, 2005, The 5$^{th}$ International Workshop on Automatic Processing of Fringe Patterns, pp. 372-379.
Kelly et al. (2001) "Optimization Studies for Integrated Solar Combined Cycle Systems," Proceedings of Solar Forum 2001, Solar Energy: The Power to Choose, Apr. 21-25, Washington, DC.
Lietner et al. (2002) "Brighter than a Hundred Suns," U.S. Department of Energy/NREL publication, p. 10 of 144-06P spec.
Mulholland, G.W. and Germer, T.A. (2003), "Modeling, Measurement and Standards for Wafer Inspection," Proc. Government Microcircuits Applications and Critical Technologies Conference, "Countering Asymmetric Threats," Tampa, FL, published on ScatterWorks, In. website.
NOVATEC BioSol AG Presentation Nov. 7, 2007. http://www.menarec.org/resources/NOVATEC-BioSol_20071107.pdf.
NOVATEC BioSol AG Presentation Nov. 26, 2007. Hotel Intercontinental Germany-Frankfurt. http://www.rural-electrification.com/cms/upload/pdf/Presentations_Jordanian_Delegation_Visit/07_NOVATEC-BioSol_20071126.pdf.
Product Literature for Portable Specular Reflectometer Model 15R, Devices and Services Company, http://devicesandservices.com/prod02.htm, last modified May 25, 2007.
Ulmer, S et al. (2006), "Slope Measurements of Parabolic Dish Concentrators Using Color-coded Targets," SolarPACES2006 A7-S5:1-8.
(Dec. 19, 2007) "Aquaflector." http://www.aquaflector.com/index.html.
(Dec. 19, 2007) "Aquaflector." http://www.aquaflector.com/rationale.html.
(Dec. 19, 2007) "Aquaflector." http://www.aquaflector.com/technology.html.
(Dec. 19, 2007) "Aquaflector." http://www.aquaflector.com/contact.html.
International Search Report dated Jun. 1, 2010 for International Application No. PCT/US2010/021020.
International Search Report dated Feb. 20, 2009 for International Application No. PCT/US09/30872.
International Search Report corresponding to International Application No. PCT/US06/62046, Mailed Jul. 17, 2008.
International Search Report and Written Opinion, Corresponding to International Application No. PCT/US09/49945, Mailed Sep. 2, 2009.
International Search Report and Written Opinion, Corresponding to International Application No. PCT/US2009/054531, Mailed Oct. 30, 2009.
(Mar. 20, 2008) "Precision Actuator Puts New Spin on Solar Power," Machine Design 24: http://machinedesign.com/article/precision-actuator-puts-new-spin-on-solar-power-0320.
First Office Action issued from the State Intellectual Property Office of China on Jan. 4, 2012, for Chinese Patent Application No. 200980126634.9.
Second Office Action issued from the State Intellectual Property Office of China on Oct. 18, 2012, for Chinese Patent Application No. 200980126634.9.
Third Office Action issued from the State Intellectual Property Office of China on Jun. 18, 2013, for Chinese Patent Application No. 200980126634.9.
Extended European Search Report issued from the European Patent Office on Jan. 13, 2014, for European Patent Application No. 09795206.3.

\* cited by examiner

SPACE FRAME CONNECTOR

CROSS-REFERENCE TO RELATED APPLICATIONS

This application claims priority to U.S. Provisional Application Ser. No. 61/079,382, filed Jul. 9, 2008 and U.S. Provisional Application Ser. No. 61/091,095, filed Aug. 22, 2008, both of which are incorporated by reference herein to the extent that not inconsistent herewith.

BACKGROUND

A space frame is a truss-like, lightweight rigid structure constructed from interlocking struts in a geometric pattern. Space frames usually utilize a multidirectional span, and are often used to accomplish long spans with few supports. They derive their strength from the inherent rigidity of the triangles used in the frame structure. Typically, a system of parallel axial chords is braced by multiple struts intersecting them at different angles, referred to herein as "oblique strut tubes." These nodes, where struts are fastened together, should utilize connector structures that are strong enough not to fail under the considerable stresses involved.

Many connector designs for connecting multiple rods or struts are known to the art, e.g., as disclosed in U.S. Patent Publication No. 2007/0011983, U.S. Pat. Nos. 6,250,693, 5,820,168, 4,352,511, 6,409,228, 3,070,923, 6,056,240, 6,892,502, 1,760,883, 3,668,754, 5,350,201, 5,448,868, 3,459,234, PCT Publication No. WO 96/33787 and Japanese Patent Abstract JP 11182026.

All references identified herein are incorporated herein by reference to the extent not inconsistent herewith for purposes of written description and enablement.

SUMMARY

The space frame connector of this invention is useful where space frames that are lightweight and easy to assemble are desired, yet strength and stability cannot be sacrificed. For example: a) space frames used for solar energy concentration devices that require accurate lightweight structures; b) space frames used for bridges; c) space frames used for architectural domes, large-span roofs, or other geometrical shapes; and d) space frames used for radio telescopes or spacecraft-launched frameworks where very lightweight structures are needed and where quick and easy assembly is important. The space frames hereof can be of any required size in accordance with the use to which the space frame is to be put. In an embodiment used for solar energy concentration, the connectors provided herein can withstand at least about 5,000 lbs of axial force, and in embodiments can withstand up to about 10,000 pounds or more than about 11,000 to about 11,500 lbs of axial force.

The design of the space frame connectors hereof is such that the mode of failure of the space frame is forced away from failure of the connector and into failure of the oblique strut tube, either from axial tension or axial compression. (For long slender members this would be considered "buckling".) The connectors are designed based on avoidance of shear tear-out of the strut material or failure of the collar and its attachment flanges. The loads are dependent on the allowable shear strengths of the materials, the wall thickness of the strut and the dimensions of the fastener defining the bearing area of the fastener. Especially in the field of space frames for solar energy collectors, to ensure ease of manufacture, ease of assembly in the field, stability for accurate alignment of reflective surfaces, and low cost, it is important to minimize the number of components that have to be assembled in the field, as well as minimizing fabrication steps, and the need for close tolerances in manufacturing the components.

An assembly method for space frames is to weld the space frame struts together, but this often requires expensive welder labor and is extremely slow. Moreover, when aluminum components are used, there is a significant loss in strength; and in addition, field welding is prohibited by Aluminum Association Structural Welding Code D1.2.

The space frame connectors provided herein allow for a simplified assembly process, which leads to reductions in assembly labor costs and shortens the time required to bring a solar project on line, which reduces financing costs of such a projects (e.g., interest during construction).

A frequent problem in assembling space frames using struts that are square or rectangular in cross-section is that when these are manufactured by extrusion, they tend to develop twist, which makes it difficult to line up the holes in the struts correctly with the holes in the connector to which they are to be attached for attachment by means of pins or bolts. Additionally, when both ends of a square or rectangular extruded strut needs to be fitted into similarly-shaped brackets on two different connectors, the twist in the strut will make it difficult, if not impossible, to place the connector in both brackets. Use of oblique struts that are circular in cross-section and have extrusion flanges formed on the ends thereof, allows efficient fabrication and ease of assembly.

The space frame connectors provided herein are capable of supporting axial loads in compression and tension, are economic to manufacture, and simple to make and use, not requiring sophisticated tools.

In an embodiment, an advantageous method of completing the connection between the oblique struts and the axial strut is to use a close-tolerance expandable structural fastener or other fastener component, such as a spring bushing, that enforces proper alignment of mating holes in the connection. These fastener components not only inherently enforce proper alignment of the holes in the mating pieces, but are also designed such that they are capable of carrying all shear loads through the connection. Thus, the failure mode of the joint is not controlled by the connector but by the capacity of the strut. These means for enforcing proper alignment of the components of the space frame connectors hereof are sized such that they function not only to carry the shear stresses through the joint but also act as alignment pins creating an accurate interference fit between the oblique strut and the attachment flange on the axial strut.

Accordingly, provided herein is a space frame connector for attaching an oblique strut tube to an axial chord of a space frame, the space frame connector comprising a collar adapted to fit over or inside the axial chord, the collar comprising one or more attachment flanges; and a strut tube comprising an extrusion flange at the end thereof; the extrusion flange comprising first and second parallel leaves defining a slot therebetween, the slot being sized and shaped to fit over the attachment flange.

The attachment flange and extrusion flange can comprise attachment holes sized and positioned such that they can be aligned during use to receive a fastener component that passes through the aligned holes, such as an expandable structural fastener or spring bushing, bolt, pin, or other such fastener component known to the art.

The extrusion flange can be integrally formed from the end of the oblique strut tube, or can be a component of an end connector attached to the end of the oblique strut tube.

Advantageously, the collar is a sleeve that fits entirely around or within the circumference of the axial chord to provide the strength required for construction of large-scale space frames for use in supporting large-scale parabolic solar collectors. Also provided herein is a space frame connector attached to an axial chord of a space frame.

A strut tube is also provided comprising an extrusion flange at an end thereof, the extrusion flange comprising first and second parallel leaves defining a slot therebetween. Strut tubes comprising extrusion flanges at one end and/or at both ends are also provided.

Further provided is a method of making a strut tube equipped with an extrusion flange. The method comprises forming a slot in the end of the strut tube; inserting a separator component of a press tool into the slot; and operating the press tool to flatten the slotted end of the strut tube to form two parallel leaves. The method can also comprise punching attachment holes in the parallel leaves. The method can further comprise rounding the end corners of the extrusion flange by removing extraneous material therefrom. Advantageously, the end corners are cut off by the punch tool used to punch the attachment holes.

A method of attaching an oblique strut tube to an axial chord of a space frame is also provided. The method comprises providing a space frame connector as described above; sliding the leaves of the extrusion flange over an attachment flange of the collar; and securing the leaves to the attachment flange. The leaves can be secured to the attachment flange by means of a fastener component such as an expandable structural fastener, spring bushing, bolt, pin, or other such fastener component known to the art placed through aligned holes in the leaves and attachment flange, A space frame comprising one or more space frame connectors as described above can be constructed. The space frame can be constructed by a method comprising providing an axial chord; equipping the axial chord with a collar comprising one or more attachment flanges; providing an oblique strut tube; equipping an end of the oblique strut tube with at least one extrusion flange; and attaching the oblique strut tube to the axial chord by attaching the extrusion flange to the attachment flange. The method can additionally comprise attaching multiple oblique strut tubes to an axial chord to form a node. In addition, multiple oblique strut tubes can be attached to multiple axial chords to form multiple nodes. The oblique strut tubes can be equipped with extrusion flanges at one or both ends and the ends can then be attached to separate axial chords, or one end of the oblique strut tube can be attached to another oblique strut tube and the other end can be attached to an axial chord. The space frames constructed by the foregoing methods can be used to support solar collectors by attaching one or more solar reflectors and other components known to the art, such as receiver tubes, to the space frame. Advantageously, the space frame struts and chords are tubes that are circular in cross-section.

The components for use in space frame connectors for space frames used to support large parabolic solar collectors typically have dimensions as follows: The extrusion flanges typically are between about 2 and about 4 inches wide, between about 2 and about 3 inches long, and each leaf is between about 0.0625 inches to about 0.125 inches thick. The collar is typically between about 5 inches and about 9 inches long, between about 3 inches and about 3.625 inches in outside diameter, and its wall is between about 0.1875 inches and about 0.3125 inches thick. The attachment flanges on the collars are typically between about 3 inches and about 4 inches wide, between about 5 inches and 9 inches long, and between about 0.1875 inches and about 0.50 inches thick.

The components hereof can be made by means known to the art, including extruding, casting, powder metallurgy, and machining. In addition to the exemplary aspects and embodiments described above, further aspects and embodiments will become apparent by reference to the drawings and by study of the following descriptions.

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, tools and methods that are meant to be exemplary and illustrative, not limiting in scope. In various embodiments, one or more of the above-described problems with prior art connectors have been reduced or eliminated, while other embodiments are directed to other improvements.

The term "space frame connector" is defined herein to include all essential components required for attaching multiple (two or more) struts together.

The term "axial chord" has its ordinary meaning in the art of space frame construction, to refer to a strut to which multiple oblique strut tubes are attached at a single node. Typically such nodes, comprising multiple oblique strut tubes attached to said axial chord, occur at intervals along the axial chord. As many space frame connectors can be attached to each axial chord as is required by the space frame. For example, in an embodiment, such connectors are attached every twelve feet or so along the axial chord, using five or more, seven or more, or more connectors, depending on the length of the axial chord.

The term "oblique strut tube," also referred to herein as "oblique strut" or "strut tube," has its ordinary meaning in the art of space frame construction, to refer to a strut which attaches to an axial chord for purposes of providing strength and stability. As is accepted in the art, the oblique strut can attach to the axial chord at any angle other than 180° (if the oblique strut were attached end-to-end with the axial chord, this would be 180°). Typically, the oblique strut is attached to the axial chord at an angle between about 15° degrees and about 90°.

The term "multiple" as used herein means two or more.

The term, "extrusion flange" is defined as a flange at the end of a strut tube as described hereinafter. The extrusion flange is advantageously integrally formed from the material of the strut tube; however, as will be appreciated by those of skill in the art, this flange can also be formed separately, for example of heavier material than that of the strut tube, and attached to the end of the strut tubes by means known to the art or as disclosed herein. Strut tubes can be equipped with an extrusion flange at one end or both ends thereof. In an embodiment, the extrusion flanges can be reinforced by reinforcement pieces as described herein (see element 7 of FIG. 3).

Figure 1:
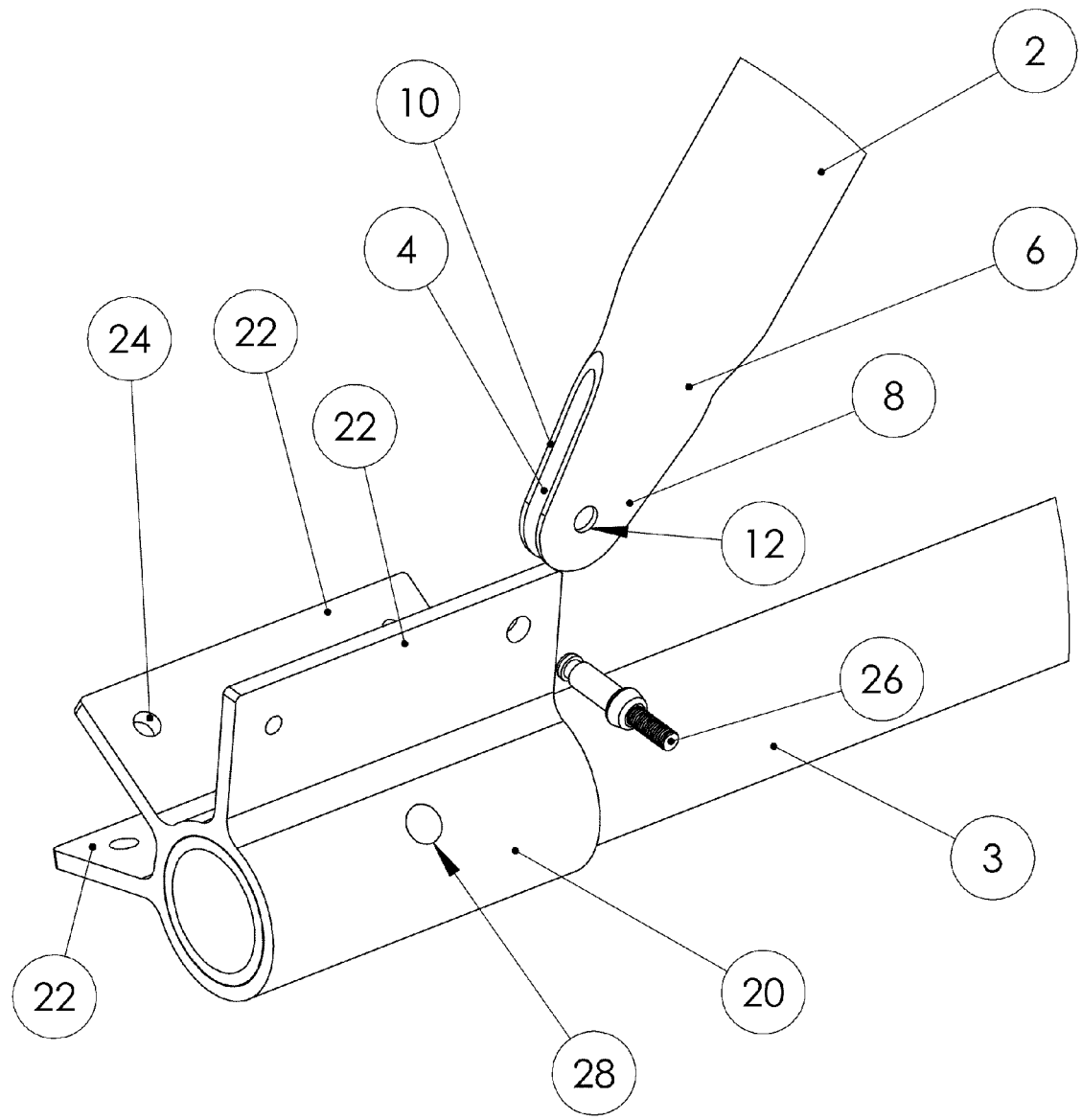
FIG. 1 is an exploded front perspective view of the components of an embodiment of the space frame connector ready for assembly.

FIG. 1 is an exploded perspective view of an embodiment of the components of the space frame connector ready for assembly. Collar 20 is a sleeve that is sized and shaped to fit over an axial chord 3 of a space frame, and can be secured thereto by means known to the art, such as by pinning, riveting, or bolting through collar attachment hole 28.

Figure 3A:
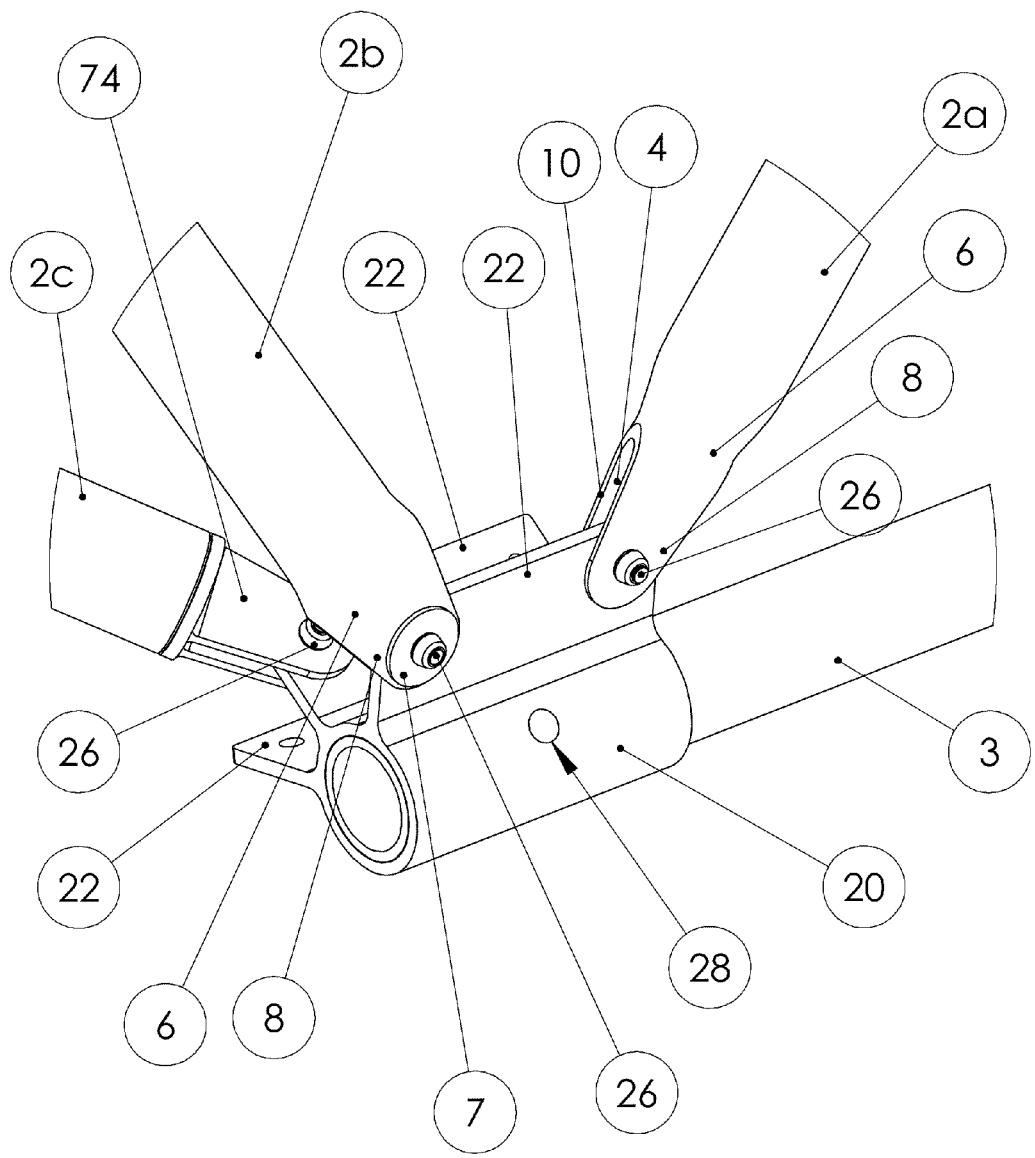
FIG. 3A is a perspective view illustrating two embodiments of the connector hereof assembled with an axial chord and oblique strut tubes.

Collar 20 is equipped with one or more attachment flanges 22 to which strut tubes 2 can be attached to form a node where one or more strut tubes 2 are attached to an axial chord (see FIG. 3A). The collar can be equipped with any number of attachment flanges 22 consistent with the dimensions of the components that are attached to the attachment flanges 22. For example, each collar 20 can be equipped with one or more, e.g., three to about eight attachment flanges 22. Each attachment flange 22 is pierced with one or more attachment holes 24 that are used for attaching strut tubes 2 to the attachment flanges 22. Each attachment flange 22 can be pierced with any number of attachment holes 24 consistent with the size and shape of the components to be attached. For example each attachment flange 22 typically has one, two or three attachment holes 24. The attachment holes 24 can be evenly spaced on attachment flange 22, or can be spaced in staggered rows or in any other configuration required to accommodate the components at the site of the node. Each strut tube 2 has an extrusion flange 6 formed at the end thereof. Extrusion flange 6 has a first leaf 8 and a second leaf 10, which are parallel to each other, with a slot 4 therebetween. Slot 4 is sized and shaped to receive attachment flange 22 of collar 20 therein.

First leaf 8 is pierced with a first flange attachment hole 12, which is aligned with a second flange attachment hole 13 (shown in FIG. 2) in second leaf 10. These holes are sized, shaped and aligned so as to align with attachment hole 24 of collar 20 and allow placement therethrough of a fastener component that passes through the aligned attachment holes. In an embodiment, the fastener component is an expandable structural fastener 26. Alternatively, other fastening components such as spring bushings, pin fasteners, nut and bolt assemblies or other such components known to the art can be used. First and second leaves 8 and 10 can be of any size consistent with their being able to fit on attachment flange 22, especially if more than one oblique strut tube 2 is to be connected to the same attachment flange 22. The larger the leaves, the stronger the connection will be.

Figure 2:
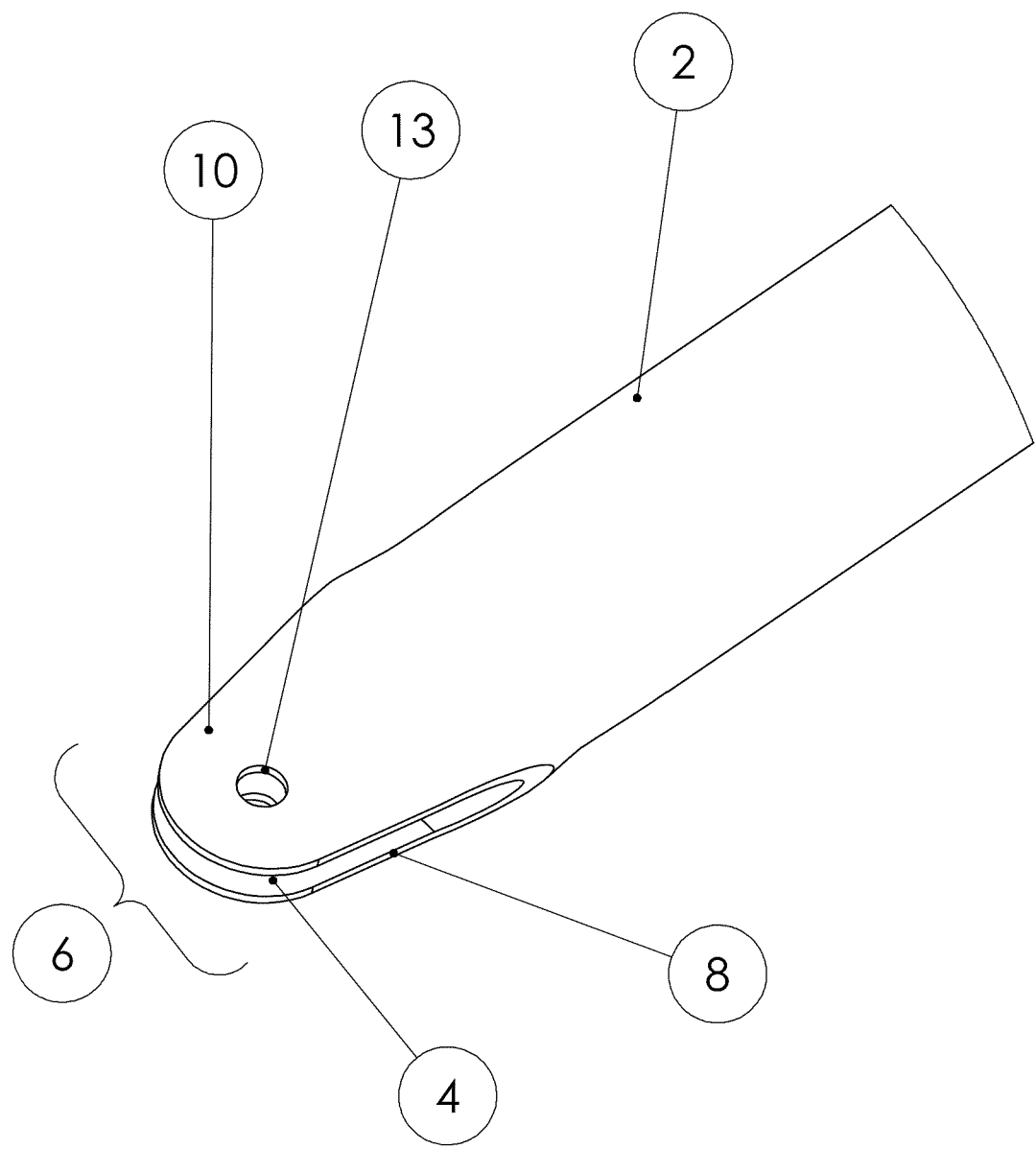
FIG. 2 is an enlarged back perspective view of the strut tube component with an extrusion flange formed at the end thereof that was shown in FIG. 1.

FIG. 2 is an enlarged perspective view of the strut tube 2 with extrusion flange 6 formed at the end thereof that is shown in FIG. 1. FIG. 2 shows extrusion flange 6, which is made up of first leaf 8, and second leaf 10 with slot 4 therebetween. Attachment hole 13 in second leaf 10 is shown in this view.

Figure 3B:
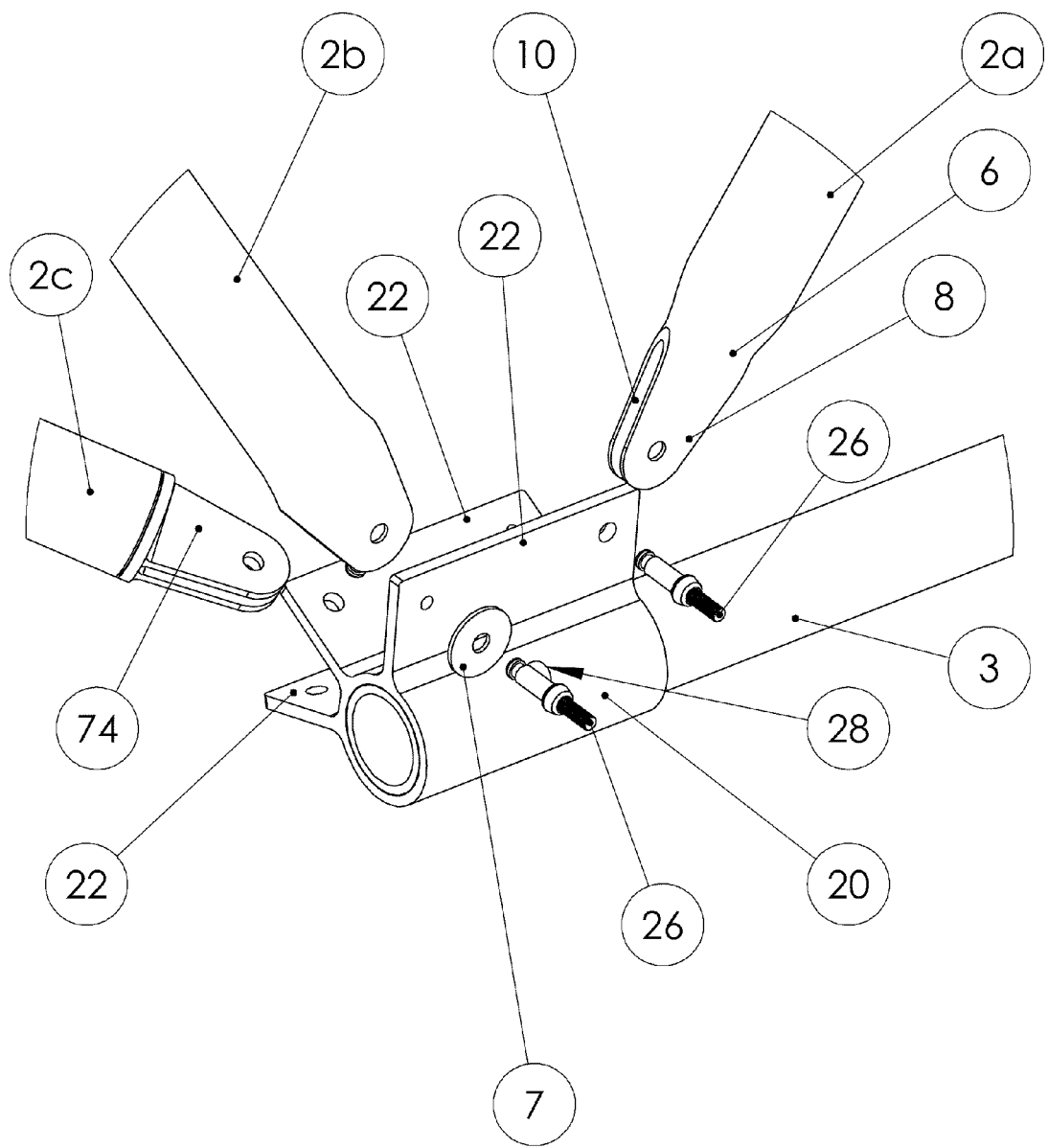
FIG. 3B is an exploded view showing alignment of the components shown in FIG. 3A ready for assembly.

FIG. 3A is a perspective view illustrating two embodiments of the connector hereof assembled with an axial chord 3 and multiple oblique strut tubes 2. FIG. 3B is an exploded view showing alignment of the components shown in FIG. 3A ready for assembly. Collar 20, comprising attachment flanges 22 and collar attachment hole 28, surrounds axial chord 3. In a first embodiment, oblique strut tube 2a, comprising extrusion flange 6 with its first and second leaves 8 and 10, is attached to attachment flange 22 by means of an expandable structural fastener 26. Oblique strut tube 2b comprises extrusion flange 6 reinforced with reinforcement piece 7, and attached to attachment flange 22 by means of another expandable structural fastener 26. In an alternate embodiment, oblique strut tube 2c is attached to attachment flange 22 by means of end connector 74. In this embodiment, an attachment hole of attachment flange 22 is equipped with holes to be aligned with holes in end connector 74. Expandable structural fastener 26 is installed through the aligned holes in attachment flange 22 and end connector 74 to achieve a tight fit requiring minimal radial clearance. End connector 74 can be made by any means known to the art, preferably by die casting or powder metallurgy. Attachment of end connector 74 to strut tube 2 can be by any means known to the art, including friction means, e.g., by providing roughened portions or teeth on either the outside end surface of oblique strut tube 2 or the inside of the portion of end connector 74 that engages with the outside end of oblique strut 2, or both, or by other means known to the art such as press fitting, using adhesives, using rivets, or welding. Advantageously it is done by means of press fitting or use of rivets. The end connector 74 can be made to fit over the outside of the end of oblique struts 2 as shown, or can be made to fit inside oblique struts 2, e.g., by providing friction surfaces on the engaging portions of strut tube 2 and/or end connector 74.

Figure 4:
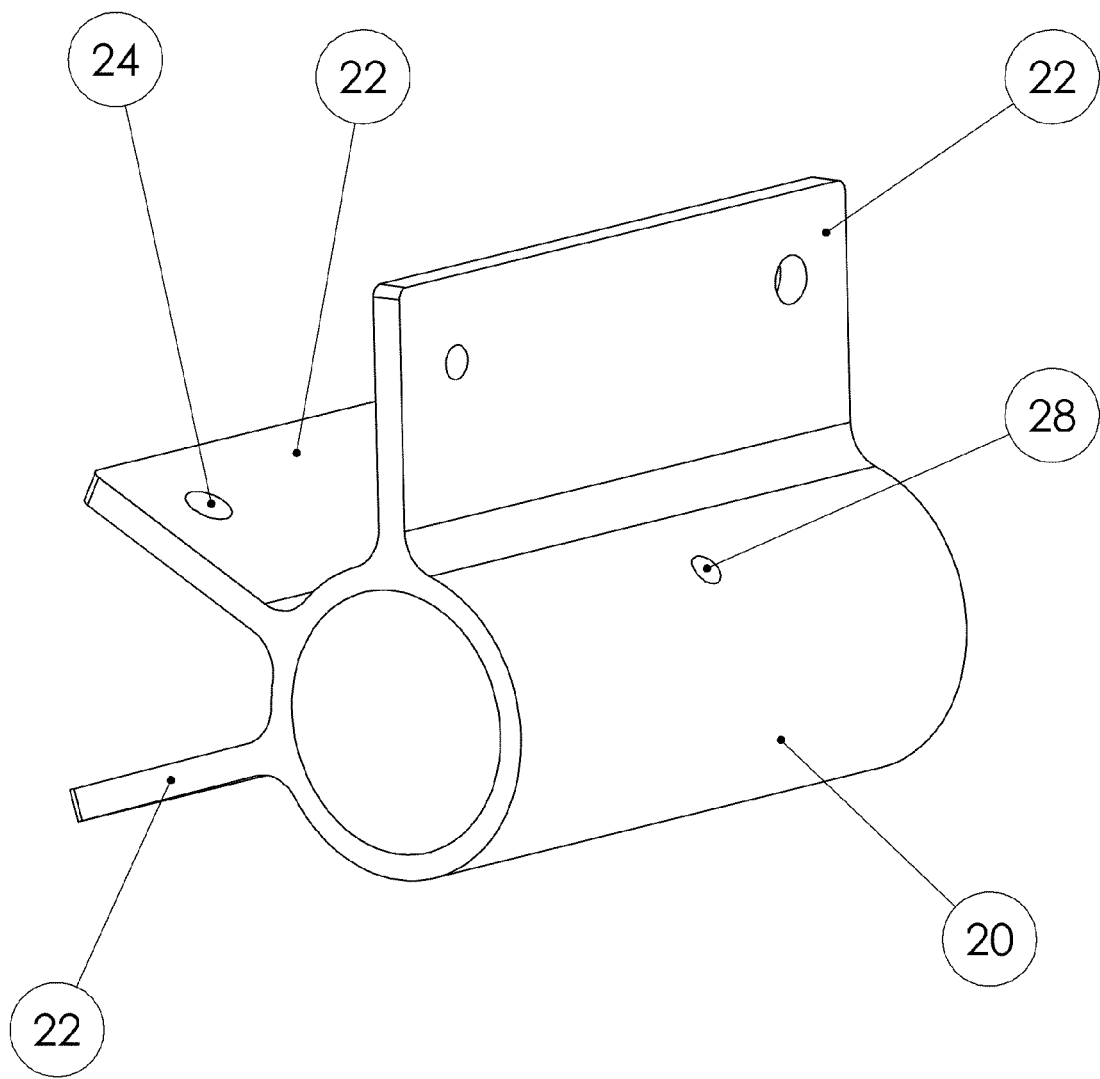
FIG. 4 is an enlarged perspective view of the collar component that was shown in FIGS. 1 and 3.

FIG. 4 is an enlarged perspective view of the collar 20 shown in FIG. 1, showing attachment flanges 22 and attachment holes 24, as well as collar attachment hole 28.

Referring to FIGS. 1 and 2, to attach an oblique strut tube 2 to an axial chord of a space frame, collar 20 is placed around the axial chord. This can be done in the field, or the collars and axial chords can be pre-assembled before transport to the field. Collar 20 can be attached to axial chord 20 by bolting, or pinning via collar attachment hole 28 and an aligned hole in axial chord 3 (not shown), or by any other means known to the art. Slot 4 at the end of extrusion flange 6 is placed over attachment flange 22 of collar 20 so that first and second flange attachment holes 12 and 13 in first and second leaves 8 and 10 respectively are aligned with an attachment hole 24 of attachment flange 22 of collar 20. First and second leaves 8 and 10 of extrusion flange 6 should be substantially flat and parallel to each other in order to fit over attachment flange 22 and maintain a secure connection.

In an embodiment, expandable structural fastener 26 is placed through first attachment hole 12 in first leaf 8 of extrusion flange 6, first attachment hole 24 in attachment flange 22 of collar 20, and second attachment hole 13 in second leaf 10 of extrusion flange 6, in order to fixedly attach strut tube 2 to the axial chord 3. The leaves 8 and 10 of extrusion flange 6 are held parallel and in intimate contact with attachment flange 22 via the use of expandable structural fastener 26. Such expandable structural fasteners are commercially available, e.g., from Alcoa Fastening Systems, Pittsburgh, Pa. Expandable structural fastener 26 is designed to carry the entire shear load in the connection. The expandable structural fastener 26 also provides a fit tight enough to keep extrusion flange 6 from rotating on attachment flange 22.

Figure 5:
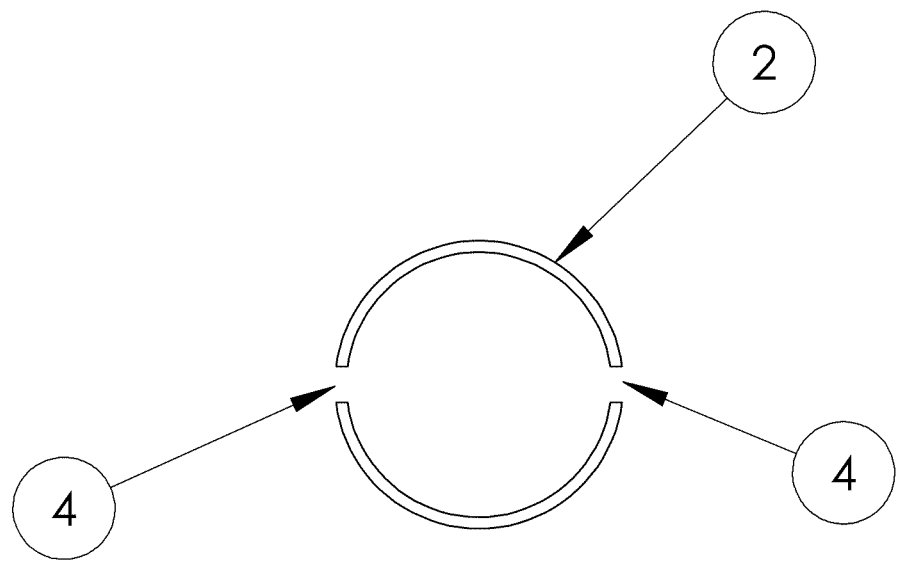
FIG. 5 is an end view of a strut tube having a slot formed therein, illustrating a step in fabrication of the extrusion flange.

FIG. 5 is an end view of a strut tube 2 having a slot 4 formed thereon, illustrating the first step in fabrication of an extrusion flange at the end of the strut tube 2. The cut to form slot 4 can be made by punching, milling, using a metal saw, or other means known to the art. The cut can be made before or after the end of strut tube 2 is pressed.

Figure 6:
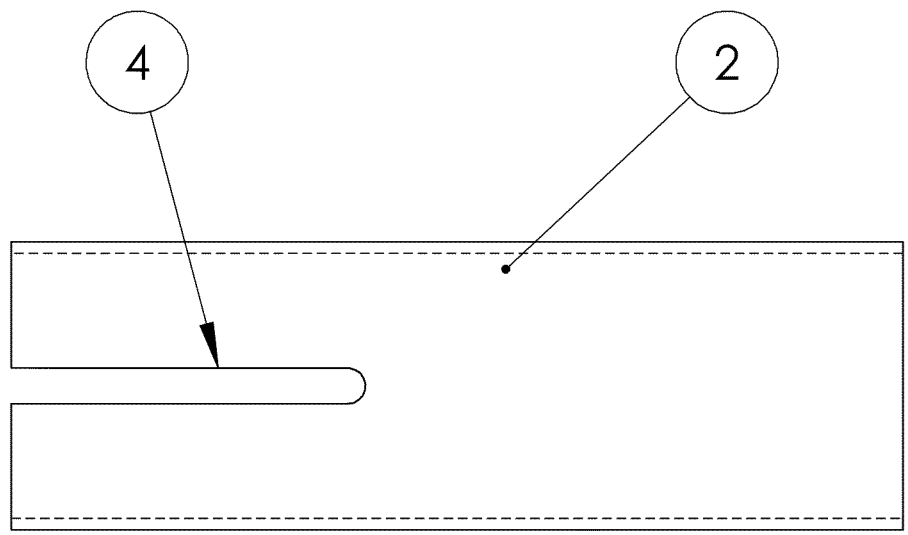
FIG. 6 is an enlarged side view of the strut tube having a slot formed therein that was shown in FIG. 5.

FIG. 6 is an enlarged side view of the strut tube 2 shown in FIG. 5, having the slot 4 formed therein.

Figure 7:
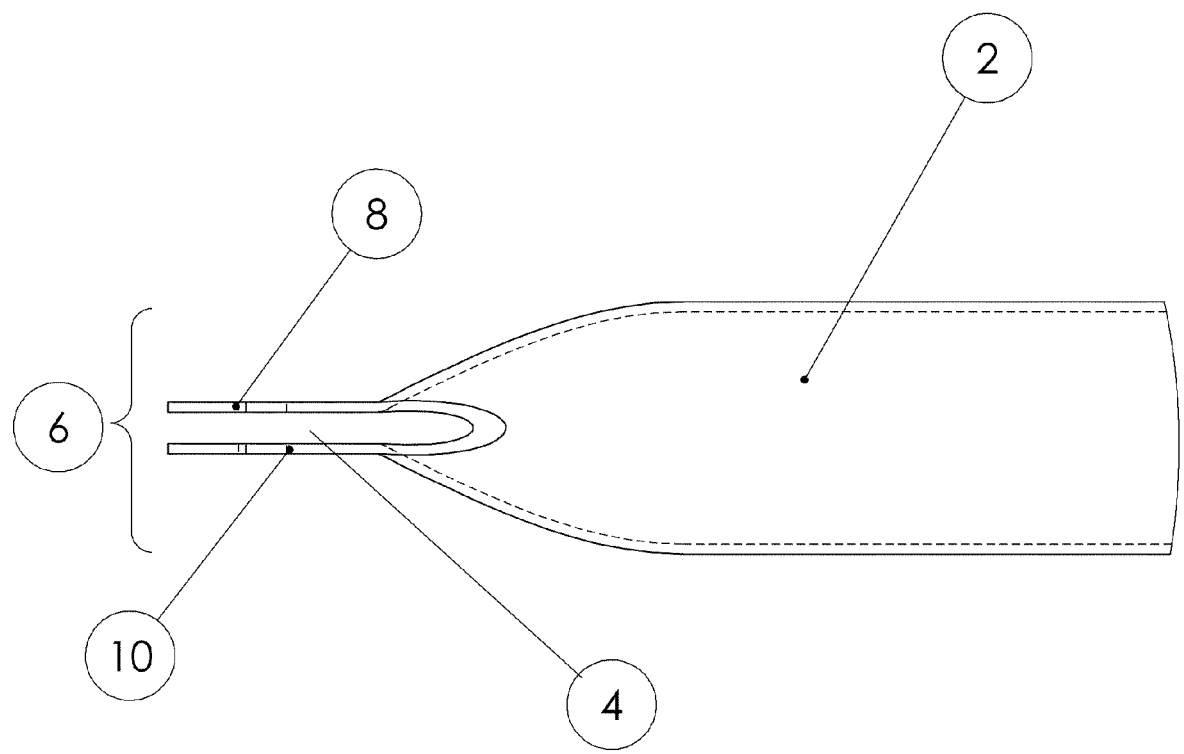
FIG. 7 is an enlarged side view of the strut tube having an extrusion flange formed at the end thereof that was shown in FIGS. 5 and 6.

FIG. 7 is an enlarged side view of strut tube 2 having an extrusion flange 6 formed at the end thereof. Extrusion flange 6 is made up of first leaf 8 and second leaf 10 with slot 4 therebetween.

Figure 8:
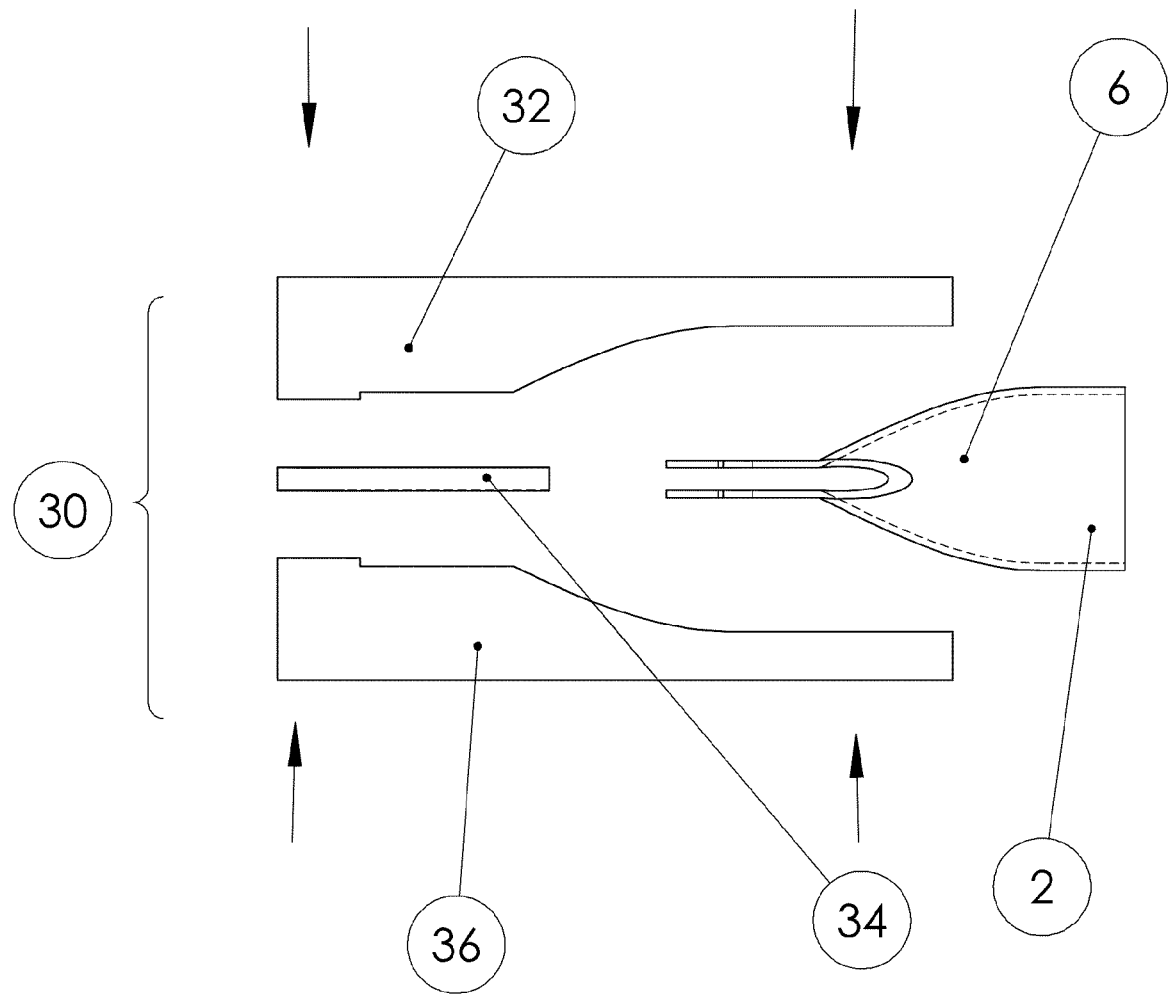
FIG. 8 is a side cross-sectional view of a press tool for forming an extrusion flange at the end of a strut tube. The end of the strut tube having the extrusion flange formed in the press tool is also shown.

FIG. 8 is a side cross-sectional view of a press tool 30 that can be used for forming extrusion flange 6 at the end of strut tube 2. The formed extrusion flange 6 is also shown. Press tool 30 comprises a top press piece 32, a bottom press piece 36 and a separator 34 between them. These components are part of a conventional press device such as is used in end forming or multistep sheet metal forming processing.

After slot 4 has been formed in the end of strut tube 2 as described above, the slotted end of strut tube 2 (as shown in FIG. 6) is placed over separator 34 of press tool 30, so that the end of strut tube 2 fits into the cavity between top press piece 32 and bottom press piece 36. Press tool 30 is then operated to bring top and bottom press pieces 32 and 36 together as shown by the arrows to flatten the end of strut tube 2 and form extrusion flange 6.

Figure 9:
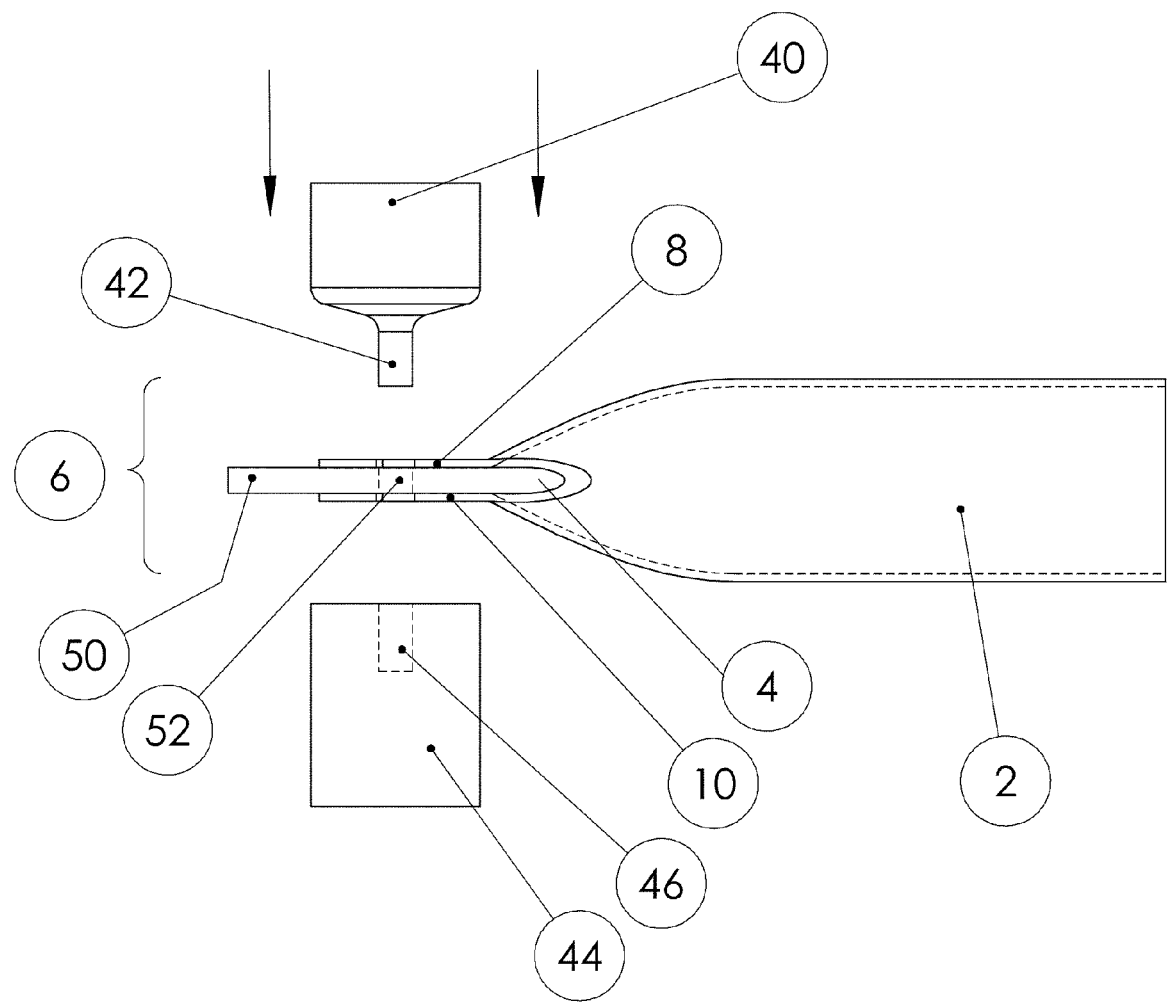
FIG. 9 is a side exploded view of punch tool components positioned to punch a tube attachment hole through both leaves of an extrusion flange formed at the end of a strut tube.

The next step is to form the tube attachment holes 12 and 13 in the extrusion flange 6 by punching or drilling or other means known to the art. FIG. 9 is a side exploded view of a punch tool positioned to punch tube attachment holes 12 and 13 in extrusion flange 6 at the end of strut tube 2. The punch tool comprises a male component 40 having a hole punch component 42, and a punch cup 46, which is a depression formed in punch receiver 44 that is sized and shaped to receive hole punch 42. Spacer 50, having a spacer hole 52 slightly larger than the hole to be punched and aligned with punch component 42 and punch cup 46 such that hole punch 42 will pass through spacer hole 52 in operation, can also be part of the punch tool. Leaves 8 and 10 are positioned such that spacer 50 lies within slot 4, and such that the desired position of the flange attachment holes to be created in leaves 8 and 10 (for example substantially in the center of leaves 8 and 10) is aligned with spacer hole 52 of spacer 50, with hole punch component 42 and with punch cup 46 in receiver 44. In an embodiment, the hole to be punched is about 1½ inch from each side of leaves 8 and 10. The punch tool is then operated to punch a hole through first and second leaves 8 and 10. In the construction of space frames designed to support large parabolic trough solar collectors, the strut walls are typically between about 0.065 and about 0.125 thick. In such embodiments, first and second leaves 8 and 10 should each be at least about this same thickness.

Figure 10A:
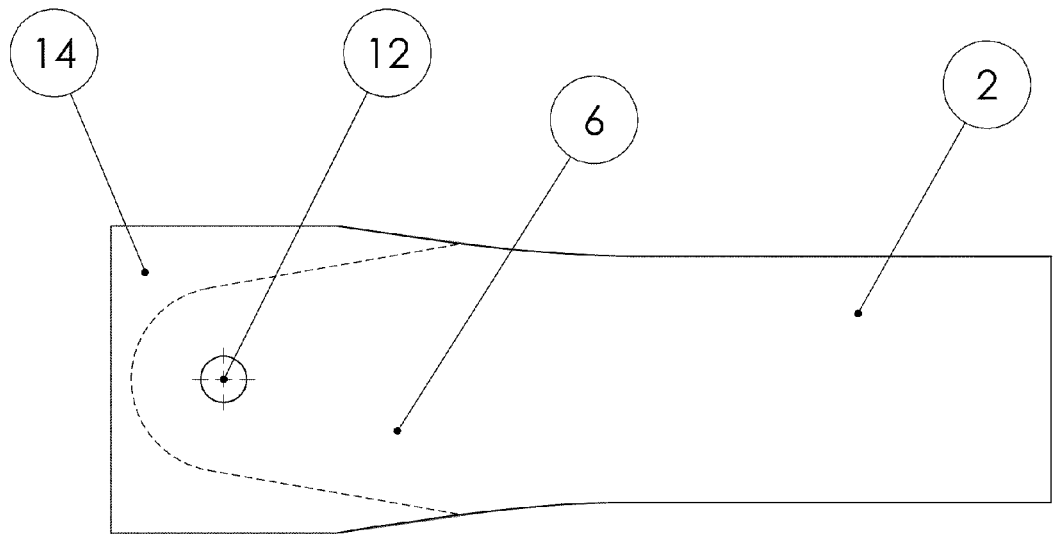
FIG. 10A is a side view of an extrusion strut flange formed at the end of a strut tube prior to removing extraneous material to round the end of the flange.
Figure 10B:
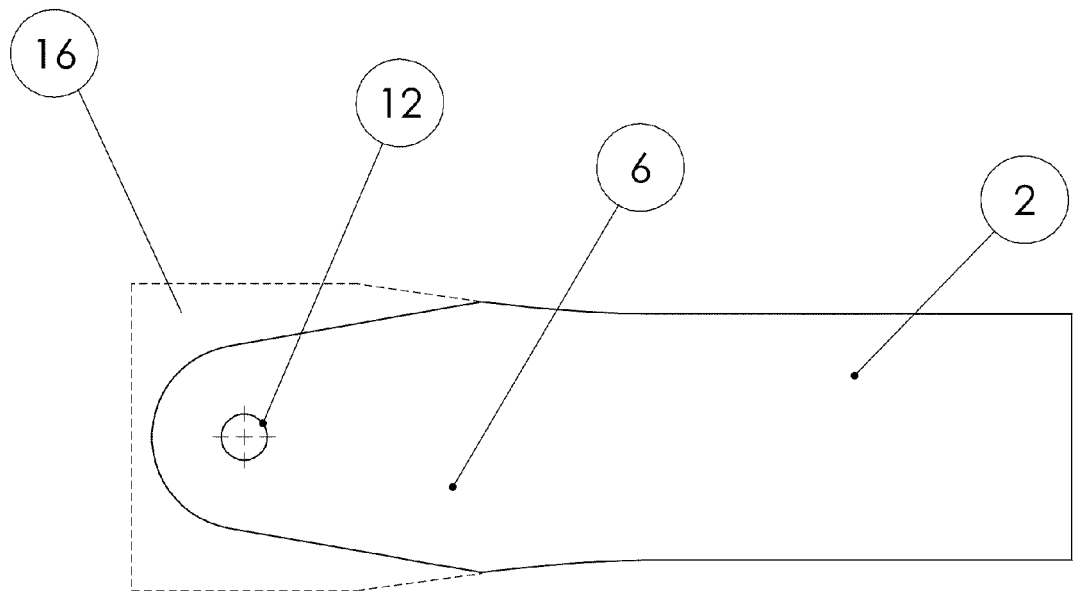
FIG. 10B is a side view of the strut flange shown in FIG. 10A after removal of the extraneous material therefrom.

After punching the flange attachment holes 12 and 13 in the flange leaves 8 and 10, it is advantageous to remove extraneous material from extrusion flange 6. FIG. 10A is a side view of extrusion flange 6 prior to removal of extraneous material 14 in order to round the corners at the end of extrusion flange 6. The extraneous material 14 can be cut away by means of the press punch that puts the holes in the flanges, so that it punches the holes and rounds the corners all in one process, or the extraneous material 14 can be removed by cutting using other means known to the art, by grinding, or by other methods known to the art. FIG. 10B is a side view of extrusion flange 6 shown in FIG. 10A after removal of the extraneous material therefrom. Dotted lines indicate the removed material 16. Removing this unneeded material saves cost when done at the time the holes are punched, and also saves weight and provides clearance for joint connector components.

Figure 11:
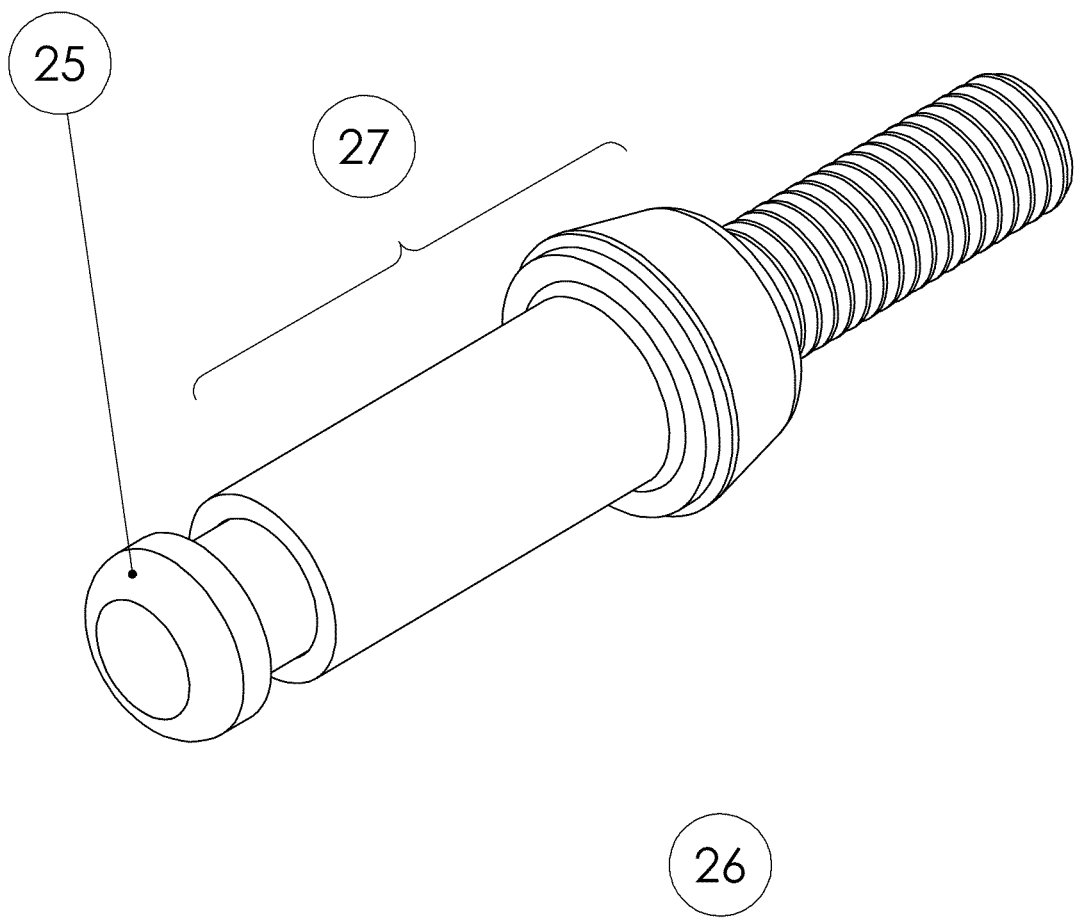
FIG. 11 is a perspective view of an expandable structural fastener used herein.

FIG. 11 is a perspective view of an expandable structural fastener 26 as used herein. It is comprised of a bolt collar 27 that is sized and shaped to fit tightly into the holes of the extrusion flange and attachment flange. Using an air driven or hydraulic tool, the bolt collar 27 in combination with the bolt 25 is swaged together, causing it to form a tight, secure fit into the holes that affords an accurate and very strong connection.

Figure 12:
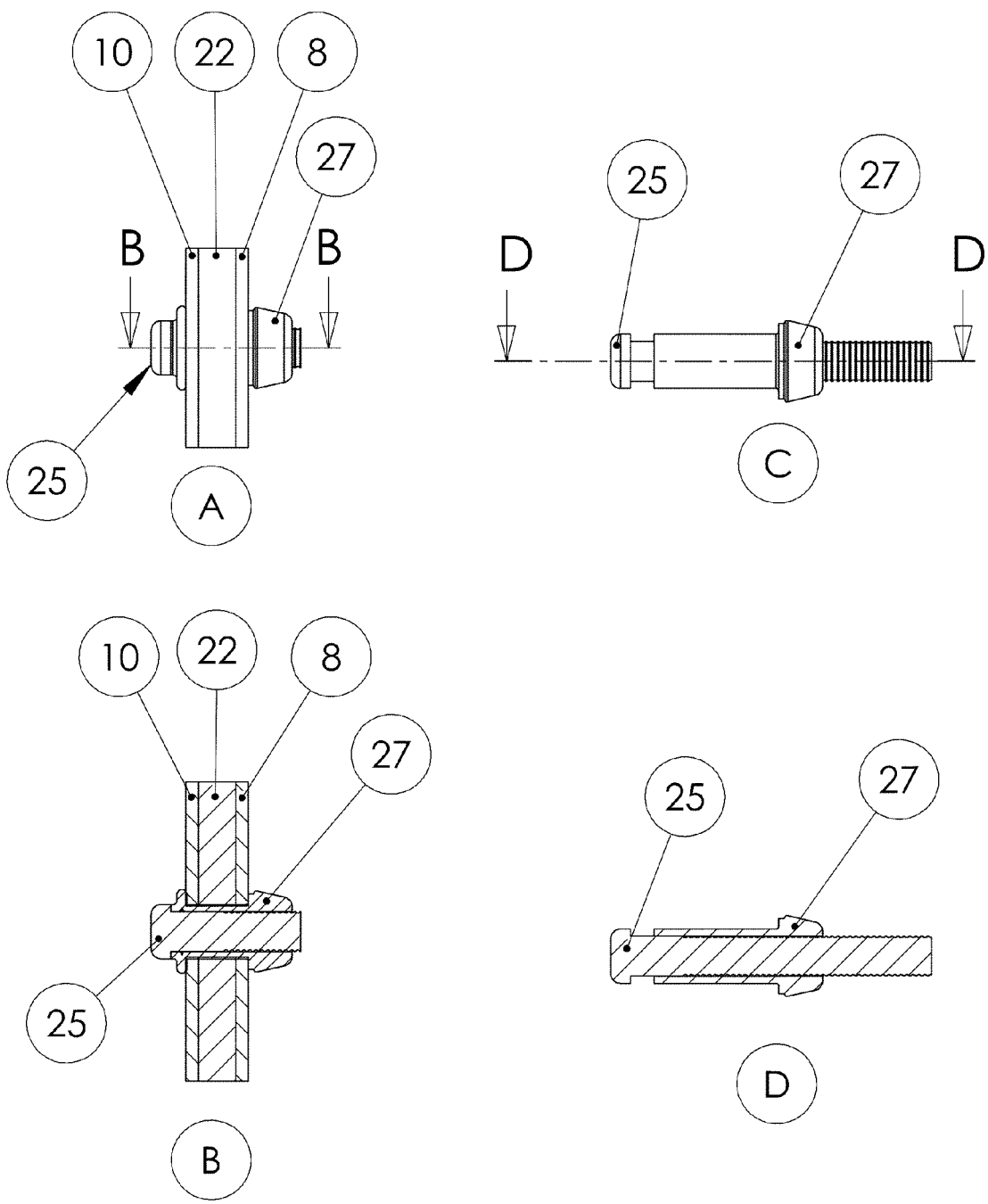
FIG. 12A is a side view of an expandable structural fastener.
FIG. 12B is a cross-sectional view of the expandable structural fastener taken along lie B-B of FIG. 12A.
FIG. 12C is a side view of the pre-assembled expandable structural fastener.
FIG. 12D is a cross-sectional view of the expandable structural fastener taken along line D-D of FIG. 12C.

FIG. 12A is a side view of an expandable structural fastener 26 as used herein, as it appears when inserted through the aligned tube attachment holes 12 and 13 in first and second extrusion flange leaves 8 and 10 and the attachment hole 24 in attachment flange 22. FIG. 12B is a cross-sectional view taken along line B-B of FIG. 12A. FIG. 12C is a side view of the pre-assembled expandable structural fastener 26, showing the bolt 25 inserted into bolt collar 27. FIG. 12D is a cross-sectional view taken along line D-D of FIG. 12C.

The expandable structural fastener 26 fits within tube attachment holes 12 and 13 of extrusion flange leaves 8 and 10 and attachment hole 24 of attachment flange 22 (shown in FIG. 1), when these holes are of greater diameter than the diameter of bolt collar 27 (FIG. 11), because the expandable structural fastener expands during assembly. Thus, expandable structural fastener 26 stays centered inside the holes, maintaining a tight and accurate fit.

Figure 13:
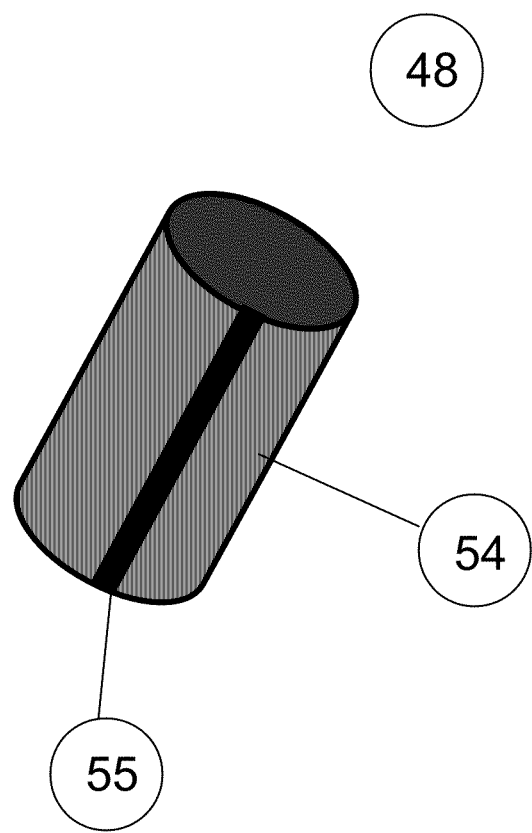
FIG. 13 is a perspective view of a spring bushing used in an embodiment hereof.

FIG. 13 is a perspective view of a spring bushing 48 used in an embodiment hereof. It is comprised of a tube 54 of zinc-plated carbon steel (AISI 1070-1800) sized and shaped to fit tightly into the holes of the extrusion flange and attachment flange without extending beyond the leaves of the extrusion flange, and to allow a bolt to be inserted therethrough. The springiness of the metal tube 54 in combination with the gap 55 down its length causes it to form a tight, secure fit into the holes that allows an accurate and strong connection.

Figure 14:
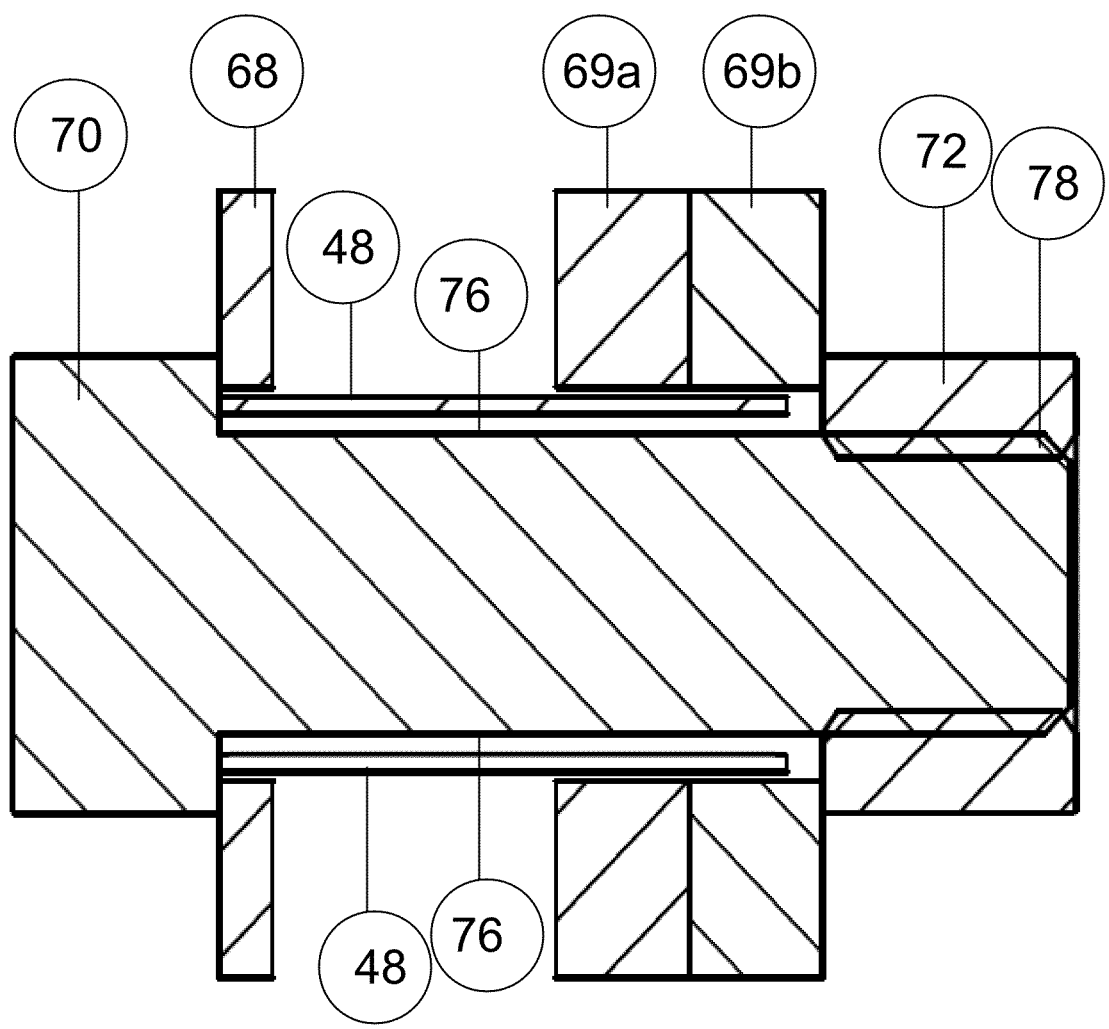
FIG. 14 is a cross-sectional view of an assembled spring bushing and bolt as used in an embodiment hereof.

FIG. 14 is a cross-sectional view of an assembled spring bushing 48 and bolt 70 as used herein, as they appear when inserted through the aligned tube attachment holes 12 and 13 of an extrusion flange 6 and attachment hole 24 in attachment flange 22 of collar 20 shown in FIG. 1. FIG. 14 shows that bolt 70 is inserted into spring bushing 48 leaving an annular gap 76 between the outside diameter of bolt 70 and the inside diameter of spring bushing 48. Between washer 68 and first spacer washer 69*a* is a space to accommodate the first and second leaves 8 and 10 of extrusion flange 6 and attachment flange 22 of collar 20 that are shown in FIG. 1. Spacer washers 69*a* and 69*b* are optional, and used only if necessary. For example, second spacer washer 69*b* as well as additional spacer washers can be used if the size of the components so requires. Spring bushing 48 fits within tube attachment holes 12 and 13 and attachment holes 24 (shown in FIG. 1), when these holes are of lesser diameter than the diameter of spring bushing cylinder 54 (FIG. 13), because the spring bushing can compress, slightly, thus reducing the size of gap 55 (FIG. 13). Thus, spring bushing 48 stays centered inside the holes, maintaining a tight and accurate fit. Bolt 70 inserted through spring bushing 48 keeps spring bushing 48 in place. Bolt 70 is secured by nut 72, shown with thread engagement areas 78 between nut 72 and bolt 70.

The components of the space frame connector hereof are advantageously made of aluminum, steel, or aluminum and steel, although other metals and materials including polymeric materials known to the art to be suitable for these purposes can also be used.

The various components are made of materials having dimensions required for balancing weight and ease of manufacture with stresses, including shear forces and loads, to which each component is subject, based on engineering analyses as known to the art. For example, in a space frame for supporting large parabolic solar collectors a single module is approximately 45' long and 22' wide and 12' tall, and weighs about 900 pounds. The extrusion flanges are advantageously fabricated from 6005 T5 aluminum and are typically the thickness of the strut wall (0.065"-0.125"), their thickness being typically based on the strut diameter such that for a 2.5" diameter tube, the walls are typically 0.065" in thickness, and for a 3" diameter tube, the walls are typically 0.125" in thickness. If necessary, the leaves of the extrusion flange can be reinforced with a reinforcement piece 7 shown in FIG. 3, which is an extra layer of metal, e.g., of the same thickness as the strut walls, attached to the outer sides of the leaves of the extrusion flange by welding, adhesives, formed inserts, or other means known to the art. The attachment flanges are advantageously made of 6061-T6 aluminum and are typically 0.375" thick.

The components can be made by casting, extruding, machining or other methods known to the art including fabrication using powder metallurgy (PM). The strut tubes are advantageously extruded. The collar is advantageously extruded or cast, although portions such as the attachment holes can be machined as necessary. Steel components are advantageously fabricated using traditional steel fabrication methods, but can also require secondary machining.

The space frame is designed to have a strength that forces the failure mode of the structure away from failure controlled by the connector connections, and toward buckling failure of individual struts. In light of the teachings hereof, strength requirements for components to achieve this design goal can be calculated by one skilled in the art and designed in accordance with such calculations without undue experimentation, and/or are readily determined by trial and error. The connectors hereof are also designed for compactness and sufficient stiffness to minimize any tendency of the space frame to wobble. Again, in light of the teachings hereof, these goals can be readily achieved by one skilled in the art without undue experimentation by adjusting the materials and sizes of the components hereof.

EXAMPLE

In an embodiment, a space frame assembled in accordance with the teachings hereof is designed to support a mirror with an aperture area of 14 M×6 M (84 $M^2$), and is constructed using aluminum struts. This is compared to mirror apertures of only about 39 $M^2$ that could be accommodated by previous space frames. This is a great increase in the aperture size of reflective mirrors that can be used for solar collectors. The assembly time per square meter has been greatly reduced, from about 10 man-hours per frame for previous space frames to about three to five man-hours per space frame for space frames provided herein. A typical solar field using the present space frames requires about half as many frames as previous solar fields, and total construction time is reduced by at least about 30%.

The walls of the 2.5" diameter strut tube (oblique strut) are about 0.065 inches thick. The first and second leaves of the extrusion flange are each about 0.065 inches thick. The slot between these leaves is about 0.375 inches thick to accommodate the thickness of the attachment flange of the joint collar. The extrusion flanges are formed by inserting the end of the strut into a press tool equipped with a spacer about 0.375 inches thick and then pressing to form the flanges. The press tool is designed to provide a radius of curvature from the slot to the fully-round portion of the strut between about 2" and about 5".

The connector is assembled using a spring bushing through the aligned holes of the extrusion flanges and the attachment flange. The tear-out strength of the connection is tested and it is able to withstand 2500 pounds of force.

Another embodiment, in which the outer surfaces of the leaves of the extrusion flanges are reinforced with 0.065" thick plates conforming to the size and shape of the leaves, is tested and found to have a tear-out strength sufficient to withstand 5000 pounds of force.

A further embodiment made using oblique struts having a 3" diameter, oblique strut walls 0.125" thick, and collar attachment flanges 0.375" thick is constructed as described above. This connector, using a spring bushing, is found to have a tear-out strength of over 11,000 pounds.

A space frame is assembled in the field by providing axial chords with collars comprising attachment flanges pre-attached. Alternatively, the collars can be attached to the axial chords in the field. Oblique strut tubes are provided on which extrusion flanges have been formed by pressing and punching as described above. Each oblique strut is positioned by sliding the leaves of its extrusion flange over an attachment flange of a the collar on the axial chord to which it is to be attached, so that the tube attachment holes in the leaves of the extrusion flange line up with the attachment hole on the attachment flange of the collar. An expandable structural fastener is then passed through the aligned holes. The expandable structural fastener provides the shear strength necessary to carry the loads on the joint. The expandable structural fastener also assures that extrusion flanges remain parallel and in intimate contact with the collar flange. In an embodiment using a spring bushing, the spring bushing is inserted through the aligned holes and a fastener, such as a nut and bolt can be inserted through the spring bushing to assure that the spring bushing does not work itself loose or out of place. The nut and bolt also assures that the extrusion flanges remain parallel and in intimate contact with the attachment flange of the collar. In an embodiment, the spring bushing alone, without a nut and bolt, pin fastener, or other fastening means, can serve to attach the extrusion flanges of the struts to the attachment flange of the collar.

In an embodiment, a space frame is constructed from the bottom up, with all the oblique struts attached by the methods described as above to the lowest axial chord. The axial chords are first put in place and fitted with collars equipped with attachment flanges. Then the oblique struts are attached and rotated into place so that their opposite ends can be attached to a higher axial strut. This process is continued until the space frame is completed. This process lends itself to construction of assemblies of axial chords with oblique struts attached in either a controlled environment or at the installation site, as these assembled components can be compactly packed for transportation and erection in the field, where the oblique struts can be rotated into place and fastened to further axial chords.

While a number of exemplary aspects and embodiments have been discussed above, those of skill in the art will recognize certain modifications, permutations, additions and sub-combinations thereof. Plastics and other materials known to the art can also be used to form the components. In locations where some struts are more highly loaded and have significantly more stress on them than other members within the space frame it can be necessary to have some struts that are made of different materials or have special end conditions to help carry extra loading. It is therefore intended that the following appended claims and claims hereafter introduced are interpreted to include these and other modifications, permutations, additions and sub-combinations as are within their true spirit and scope.

The invention claimed is:

1. A method of constructing a three-dimensional space frame comprising:
   providing one or more axial chords;
   equipping each of said axial chords with a collar adapted to fit entirely around said axial chord, said collar comprising one or more attachment flanges having a width;
   providing one or more oblique strut tubes each having a first end and a second end;
   equipping one of said ends of said oblique strut tubes with one or more extrusion flanges; and
   attaching said oblique strut tubes to said axial chords by attaching said extrusion flanges to said attachment flanges, said extrusion flanges comprising first and second parallel leaves defining a slot therebetween, said slot having a width substantially equal to said width of said attachment flanges;
   wherein said first and second parallel leaves are provided in first and second planes positioned parallel to each other;
   wherein said attachment flange and said extrusion flange comprise attachment holes sized and positioned such that said attachment holes can be aligned during use to receive an expandable structural fastener that passes through the aligned holes;
   wherein both of said first and second parallel leaves are in contact with said attachment flange; and
   wherein said expandable structural fastener expands to contact said first and second parallel leaves and said attachment flange; and attaching a solar reflector to said three-dimensional space frame.

2. The method of claim 1 further comprising attaching multiple oblique strut tubes to said axial chords to form a node.

3. The method of claim 1 further comprising attaching multiple oblique strut tubes to multiple axial chords to form multiple nodes.

4. The method of claim 3 further comprising equipping the oblique strut tubes that have been equipped with an extrusion flange with an additional extrusion flange at the other end.

5. The method of claim 4 further comprising attaching said multiple oblique strut tubes to multiple collars on said axial chords; and rotating said oblique strut tubes such that unattached ends are in position to be attached to another axial chord.

6. The method of claim 5 further comprising attaching an extrusion flange at the unattached end of each oblique strut tube to another axial chord.

7. A solar energy concentration system comprising: a three-dimensional space frame comprising:
   one or more axial chords; and
   one or more space frame connectors for attaching an oblique strut tube to said axial chord of said space frame, said space frame connectors comprising:
      a collar adapted to fit entirely around said axial chord, said collar comprising one or more attachment flanges having a width; and
      said oblique strut tube comprising an extrusion flange at an end thereof;
      said extrusion flange comprising first and second parallel leaves defining a slot therebetween, said slot having a width substantially equal to said width of said attachment flange;
   wherein said first and second parallel leaves are provided in first and second planes positioned parallel to each other;
   wherein said attachment flange and said extrusion flange comprise attachment holes sized and positioned such that said attachment holes are aligned during use to receive an expandable structural fastener that passes through the aligned attachment holes;
   wherein both of said first and second parallel leaves are in contact with said attachment flange;
   wherein said expandable structural fastener expands to contact said first and second parallel leaves and said attachment flange; and
   a parabolic solar collector supported by the three-dimensional space frame.

8. The system of claim 7, wherein two or more of said oblique strut tubes are attached to said axial chords.

9. The space frame connector of claim 7, wherein said first and second parallel leaves each have a thickness selected from a range of 0.065 to 0.125 inches.

10. The space frame connector of claim 7, wherein a thickness of said first or second parallel leave and a thickness of said attachment flange have a ratio selected from a range of 1:1.5 to 1:8.

11. The space frame connector of claim 7, wherein a thickness of said first or second parallel leave is less than a thickness of said attachment flange.

12. The space frame connector of claim 7 wherein said extrusion flange is integrally formed from the end of said oblique strut tube.

13. The space frame connector of claim 7 wherein said extrusion flange is a component of an end connector attached to the end of said oblique strut tube.

14. The space frame connector of claim 7 wherein said oblique strut tube comprises an extrusion flange at each end thereof.

* * * * *